(12) United States Patent  
Tamura

(10) Patent No.: US 8,104,227 B2  
(45) Date of Patent: Jan. 31, 2012

(54) BELT MOLDING FOR VEHICLES

(75) Inventor: Tatsuya Tamura, Aichi (JP)

(73) Assignee: Tokai Kogyo Co., Ltd., Ohbu-shi (JP)

( * ) Notice: Subject to any disclaimer, the term of this patent is extended or adjusted under 35 U.S.C. 154(b) by 502 days.

(21) Appl. No.: 12/276,008

(22) Filed: Nov. 21, 2008

(65) Prior Publication Data

US 2009/0133335 A1    May 28, 2009

(30) Foreign Application Priority Data

Nov. 22, 2007    (JP) ................................. 2007-302884  
Sep. 9, 2008    (JP) ................................. 2008-230904

(51) Int. Cl.  
     *B60J 1/16*      (2006.01)

(52) U.S. Cl. .......................... 49/377; 49/490.1; 49/495.1

(58) Field of Classification Search .................... 49/372, 49/377, 495.1, 490.1  
See application file for complete search history.

(56) References Cited

U.S. PATENT DOCUMENTS

| | | | | |
|---|---|---|---|---|
| 3,531,897 | A | * | 10/1970 | Weimar ........................ 49/495.1 |
| 4,472,469 | A | * | 9/1984 | Thies ............................ 428/122 |
| 5,125,185 | A | * | 6/1992 | Shiota et al. .................... 49/377 |
| 5,234,250 | A | * | 8/1993 | Hattass et al. ............ 296/216.09 |
| 5,253,453 | A | * | 10/1993 | Maass et al. ..................... 49/377 |
| 5,347,759 | A | * | 9/1994 | Kobayashi et al. ........... 49/496.1 |
| 5,352,009 | A | * | 10/1994 | Takeuchi .................... 296/146.9 |
| 5,388,371 | A | * | 2/1995 | Nozaki ............................ 49/377 |
| 5,970,659 | A | * | 10/1999 | Oord ............................... 49/377 |

FOREIGN PATENT DOCUMENTS

| | | |
|---|---|---|
| JP | 49-132444 A | 12/1974 |
| JP | 2-74434 A | 3/1990 |
| JP | 05-319181 A | 12/1993 |
| JP | 2002-362161 A | 12/2002 |
| JP | 2007-131270 A | 5/2007 |

OTHER PUBLICATIONS

Chinese Office Action dated Feb. 18, 2011, issued in corresponding Chinese Patent Application No. 200810177080.2.  
Japanese Office Action dated Dec. 22, 2009, issued in corresponding Japanese Patent Application No. 2008-230904.  
Chinese Office Action dated Sep. 15, 2011, issued in corresponding Chinese Patent Application No. 200810177080.2.

* cited by examiner

*Primary Examiner* — Jerry Redman  
(74) *Attorney, Agent, or Firm* — Westerman, Hattori, Daniels & Adrian, LLP

(57) ABSTRACT

A vehicle belt molding includes an attaching member and a seal lip. An elastic repulsive member is disposed between the engage wall portion and the seal lip and integrally provided with a fixed piece portion, a shifting piece portion, and a connecting piece portion. The seal lip is always urged toward the window pane by an elastic restoring force of the connecting piece portion itself or by a cooperative function of the elastic restoring force and an elastic restoring force of the elastic polymer material. When the attaching member is mounted to the mounting member, the seal lip causes the contacting portion to be elastically restored by the elastic restoring force toward a thickness direction of the window pane at a speed exceeding a restoring speed obtained only by the elastic polymer material.

21 Claims, 11 Drawing Sheets

BELT MOLDING FOR VEHICLES

This application claims priority under 35 U.S.C. §119 to Japanese Patent Applications No. 2007-302884 filed on Nov. 22, 2007 and No. 2008-230904 filed on Sep. 9, 2008, the entire disclosures of which are incorporated herein by reference in their entirety.

BACKGROUND OF THE INVENTION

1. Field of the Invention

The present invention relates to a belt molding for vehicles.

2. Description of Related Art

The following description sets forth the inventor's knowledge of related art and problems therein and should not be construed as an admission of knowledge in the prior art.

As an example of a belt molding for vehicles, an exterior or interior belt molding having a seal lip mounted to a lower edge of a side window opening of a vehicle door can be exemplified. In the belt molding, the seal lip is brought into elastic contact with a surface of a window pane (a side window glass) moved up and down in the door to wipe off water droplets and/or dirt adhered to the window glass (hereinafter, the belt molding may be simply referred to as "belt mold").

In this kind of a belt molding for vehicles, the seal lip is formed of a soft resin material having elasticity. Therefore, repeated up-and-down movements of the widow pane and/or keeping the window pane closed for a long period of time gradually causes permanent compression set in the resin material, resulting in gradual loosing of the elasticity of the seal lip, which in turn causes a difficulty in returning the seal lip to its original position. As a result, the dirt and/or water droplets wipe-off function of the seal lip deteriorates.

From the viewpoint of preventing the aforementioned drawbacks, there is known a belt molding for vehicles disclosed by, for example, Japanese Unexamined Laid-open Patent Publication No. 2007-131270 (hereinafter referred to as "Patent Document 1").

In this belt molding, a reinforcing member is embedded therein so as to be positioned from the belt molding main body to the basal end portion of the seal lip, and the material of the seal lip and that of the reinforcing member are set such that the compression set of the combination of the seal lip and the reinforcing member becomes smaller than the compression set of the seal lip itself.

In the belt molding for vehicles disclosed by Patent Document 1, in cases where both the dimension error of the window pane and the dimension error of the peripheral member fall within the central range of the tolerance, after the window pane is moved downward to the window-fully-opened position, and a predetermined time (e.g., a ten and several minutes or more) has passed in a state in which the seal lip is not in contact with the window pane, when the window pane is moved upward up to the window-fully-closed position, the seal lip returns toward the original position side by the creep recovery. Therefore, the wiping operation can be performed in a relatively favorable manner.

However, when the window pane is moved downward from the window-fully-closed position to the window-fully-opened position, and when the window pane is moved upward toward the window-fully-closed position immediately after the downward movement to the window-fully-opened position, a favorable wiping operation cannot be performed in some cases.

That is, a seal lip of a belt molding for vehicles is formed of rubber or thermoplastic elastomer having elasticity, and will be maintained in an elastically deformed state when the seal lip is brought into elastic contact with the window pane surface, which tends to cause creep deformation of the seal lip, especially at the basal end portion thereof. The deformation occurs notably when the weather strip is exposed to temperatures ranging from a higher temperature of 80° C. to a low temperature of −30° C.

In a window pane opened and closed by a normal electric window regulator, the travel time required for the window pane to move from the window-fully-closed position to the window-fully-opened position and the time required for the window pane to move from the window-fully-closed position to the window-fully-opened position are about 2 to 4 seconds, respectively Therefore, the time required for the window pane to move from the window-fully-closed position to the window-fully-opened position and immediately thereafter to move from the window-fully-opened position to the window-fully-closed position is about 4 to 8 seconds. In the case of the manual operation by hand, the time normally falls within the range of 10 to 20 seconds.

In wiping off dirt and/or water droplets adhered to the surface of the window pane by moving the window pane from the window-fully-closed position to the window-fully-opened position and immediately thereafter from the window-fully-opened position to the window-fully-closed position, the creep deformation of the seal lip still remains without being restored. Therefore, the pressing force of the seal lip against the surface of the window pane decreases as compared with the pressing force thereof before occurring the creep deformation, causing deteriorated wiping performance.

In other words, in the weather strip for vehicles disclosed by Patent Document 1 in which the permanent compression set of the combined member of the seal lip and the reinforcing member is set to be smaller than the permanent compression set of the seal lip itself, it is difficult for the seal lip to restore the original shape which is a shape before occurring the creep deformation during the aforementioned short time period.

Such defects can notably occur in part when the distance between the window pane and the belt molding during the movement of the window pane is increased by dimensional variability due to the shape errors of the window pane and the assembly errors of the window pane, or cumulative errors thereof. In a vehicle employing an opening and closing mechanism in which the window pane is displaced toward the belt molding side just before the window is fully closed and displaced in a direction away from the belt molding just after the initiation of the movement of the window pane in the opening direction, the aforementioned drawbacks occur notably all over the window pane.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a belt molding for vehicles capable of restoring a seal lip in a short amount of time as compared with a conventional one and also capable of improving wiping performance of wiping a surface of a window pane irrespective of the aforementioned errors and/or mechanism.

To attain the aforementioned purpose, the present invention provides the following structures.

[1] A belt molding for vehicles, including:

a long belt molding attaching member capable of being mounted to a mounting member disposed apart from a window pane with a predetermined space, the window pane being configured to be opened and closed in a plane direction, wherein the belt molding attaching member includes an engage wall portion, wherein the engage wall portion is positioned between the window pane and the mounting member, disposed in approximately parallel to the window pane and engaged with the mounting member when the belt molding attaching member is mounted to the mounting member;

a long seal lip integrally formed with the engage wall portion of the belt molding attaching member so as to be protruded in a direction crossing a surface of the window pane at a predetermined angle, the seal lip being capable of being brought into elastic contact with the surface of the window pane and made of a soft elastic polymer material; and a long elastic repulsive member disposed between the engage wall portion and the seal lip, the elastic repulsive member including a plate shaped material, the plate shaped material being higher in creep deformation resistance than the elastic polymer material and faster in elastic restoring speed than a creep restoring speed of the elastic polymer material, wherein the elastic repulsive member includes a fixed piece portion, a shifting piece portion and a connecting piece portion, the fixed piece portion, the shifting piece portion and the connecting piece portion being provided continuously, wherein the fixed piece portion is fixed to the engage wall portion, wherein the shifting piece portion is engaged with or integrally formed with the seal lip and configured to urge the seal lip toward the window pane, wherein the connecting piece portion is positioned between the fixed piece portion and the shifting piece portion to connect the fixed piece portion and the shifting piece portion with a predetermined angle therebetween, wherein the fixed piece portion of the elastic repulsive member is fixed to the engage wall portion in a state in which the fixed piece portion is prevented from being moved in a longitudinal direction and in a movement direction of the window pane, wherein the shifting piece portion of the elastic repulsive member is engaged with or integrally formed with the seal lip so that the shifting piece portion always urges the seal lip toward a surface side of the window pane by an elastic restoring force of the connecting piece portion itself or by a cooperative function of an elastic restoring force of the connecting piece portion itself and an elastic restoring force of the elastic polymer material, and wherein, when the belt molding attaching member is mounted to the mounting member and a distance between the engage wall portion and the surface of the window pane is increased during an opening or closing movement of the window pane, the seal lip is configured such that a contacting portion of the seal lip in contact with the surface of the window pane is elastically restored by the elastic restoring force of the connecting piece portion toward a thickness direction of the window pane at a speed exceeding a restoring speed obtained only by the elastic polymer material.

According to the aforementioned structure, in a state in which the belt molding attaching member is mounted to the mounting member, the shifting piece portion of the elastic repulsive member engaged with or integrally formed with the seal lip urges the contacting portion of the seal lip toward the surface side of the window pane by an elastic restoring force of the connecting piece portion itself or by a cooperative function of the elastic restoring force of the connecting piece portion itself and an elastic restoring force of the elastic polymer material.

During the movement of the window pane, even when the distance between the engage wall portion of the belt molding and the surface of the window pane is increased due to the errors and/or the opening and closing mechanism, the elastic restoring force of the connecting piece portion of the elastic repulsive member is functioned so that the seal lip causes the contacting portion in contact with the surface of the window pane to be elastically restored toward a thickness direction of the window pane at a speed exceeding a restoring speed obtained only by the elastic polymer material. At this time, even if the base portion of the seal lip is continued from the engage wall portion of the belt molding attaching member, the elastic restoring force of the connecting piece portion of the elastic repulsive member formed of a material large in elastic restoring speed acts on the shifting piece portion, so that the shifting piece portion causes the seal lip to be elastically restored to the original position side against the strain, such as, e.g., the compressive strain or the extension strain, or the creep deformation, generated at the base portion of the seal lip. In detail, the aforementioned strain or creep deformation generated at especially the base portion of the seal lip and larger than the other portion will function as a force opposite to a force of restoring the seal lip to the original position side, or a force weakening the restoring force (hereinafter referred to as "reaction force") during a short time range of several seconds to several tens of seconds. However, the connecting piece portion of the elastic repulsive member has a restoring force exceeding the reaction force and causes the restoring force to act on the shifting piece portion. This enables restoring of the seal lip to the original position side in a shorter time as compared with a conventional one.

In this specification, the elastic restoring speed denotes the value obtained by dividing the restoration size (distance) from a position where an elastic member is elastically deformed by receiving an external force to a position where the elastic member is restored when the external force is released by the time required to restore the original shape. That the elastic restoring speed is large means that the elastic member can be restored to the original shape in shorter time.

Thus, by functioning the elastic restoring force of the connecting piece portion of the elastic repulsive member, the seal lip can be restored in a shorter time period, which in turn can improve the performance of wiping the surface of the window pane irrespective to the errors and/or opening and closing mechanism.

[2] The belt molding for vehicles as recited in the aforementioned Item [1], wherein the engage wall portion and the seal lip have engaging portions at opposed surfaces thereof, and wherein the fixed piece portion of the elastic repulsive member formed separately from the engage wall portion and the seal lip is engaged with the engaging portion of the engage wall portion and the shifting piece portion of the elastic repulsive member is engaged with the engaging portion of the seal lip.

With this structure, in addition to the effects of Item [1], by engaging the fixed piece portion of the elastic repulsive member with the engaging portion of the engage wall portion and engaging the shifting piece portion of the elastic repulsive member with the engaging portion of the seal lip, the elastic repulsive member can be easily assembled between the seal lip side engage wall portion and the seal lip, and the elastic restoring force of the connecting piece portion of the elastic repulsive member can act on the seal lip in a preferable manner without bringing the shifting piece portion of the elastic repulsive member into contact with the window pane.

[3] The belt molding for vehicles as recited in the aforementioned Item [1] or [2], wherein, in a free state in which the seal lip is not in contact with the surface of the window pane in a window pane opened state, a tip end of the shifting piece portion of the elastic repulsive member is extended to a length sufficient to shift the contacting portion of the seal lip to a position where the contacting portion crosses an extended plane of the surface of the window pane and overlaps therewith.

With this structure, in addition to the effects of Item [1] or [2], since the shifting piece portion of the elastic repulsive member is formed so that the tip end is extended to the position where the seal lip crosses the extended plane of the surface of the window pane, the contacting portion of the seal lip can be elastically urged to the position where the contacting portion comes into contact with the surface of the window pane. Therefore, even if the surface position of the window pane varies in the internal or external direction, the dirt and/or water droplets adhered to the surface of the window pane can be wiped off clearly

[4] The belt molding for vehicles as recited in any one of the aforementioned Items [1] to [3], wherein the fixed piece portion of the elastic repulsive member is formed into a flat plate shape, and wherein a plurality of removed portions are arranged at at least the connecting piece portion of the elastic repulsive member at certain intervals in the longitudinal direction to form at least one row.

With this structure, in addition to the effects of any one of the aforementioned Items [1] to [3], in cases where the mounting member is curved along the front and rear direction of the vehicle at a predetermined curvature radius with the vehicle exterior side curved outward and the vehicle interior side curved inward and a long belt molding is mounted along the curvature, a longitudinal compressive stress will be generated at the connecting piece portion located at the inside of the curvature radius. Even in this case, since the plurality of removed portions are formed in the connecting piece portion, the removed portions absorb the longitudinal compressive strain and compressive stress generated at the connecting piece portion. Therefore, even if the belt molding is mounted along the curvature in a curved manner, the elastic repulsive member can be curved along the curvature in a preferable manner, which results in a smoothly continued curvature of the shifting piece portion without causing local deformation of the connecting piece portion and/or the shifting piece portion along the longitudinal direction.

Furthermore, the shape (dimension) and/or material of the plate-shaped material for the elastic repulsive member can be increased in freedom of choice. In detail, if the sliding resistance between the seal lip and the window pane is too large because of the excessively large elastic restoring force of the plate-shaped material used for the elastic repulsive member, the total longitudinal length of the removed portions can be adjusted to decrease the elastic restoring force so that the ratio of the total longitudinal length of the removed portions to the entire length of the connecting piece portion is further increased. This enables arbitrary selection of the plate-shaped material having a shape and/or material suitable in forming and handling the plate-shaped material. To the contrary, if the elastic restoring force of the elastic repulsive member having the removed portions is too small, the aforementioned ratio of the total longitudinal length of the removed portions to the entire length of the connecting piece portion is decreased, or all of the removed portions are eliminated.

Furthermore, forming the removed portions also contributes to the weight reduction of the elastic repulsive member.

[5] The belt molding for vehicles as recited in the aforementioned Item [4], wherein the plurality of removed portions are formed into a slit-like shape continuously extended from the connecting piece portion over an entire width of the shifting piece portion, and wherein portions of the shifting piece portion disposed between the plurality of slit-like removed portions form a fork-like shape arranged noncontinuously in the longitudinal direction.

With this structure, in addition to the effects of the aforementioned Item [4], even in cases where the mounting member is curved three-dimensionally such that the mounting member is curved at a predetermined curvature radius with the vehicle exterior side thereof curved outward and the vehicle interior side thereof curved inward along the front-and-rear direction of the vehicle, and the mounting member is curved at a predetermined curvature radius along the up-and-down direction of the vehicle, and the long belt molding is mounted in a curved manner along the aforementioned curvature, since the plurality of slit-like removed portions are formed from the connecting piece portion over the entire width of the shifting piece portion, the removed portions absorb the longitudinal compressive stress, compressive strain, tensile stress, and/or extension generated in the connecting piece portion and/or the shifting piece portion. Therefore, when the belt molding is mounted in a curved manner along the curvature, the elastic repulsive member can be curved along the curvature in a preferable manner, which results in a smoothly continued curvature of the shifting piece portion having a predetermined curvature radius without causing local deformations of the shifting piece portion along the longitudinal direction.

[6] The belt molding for vehicles as recited in the aforementioned Item [4], wherein the plurality of the removed portions are formed into a slit-like shape extending in a widthwise direction so as to continue from the connecting piece portion of the elastic repulsive member to a vicinity of a widthwise tip end portion of the shifting piece portion, and wherein the widthwise tip end portion of the shifting piece portion is integrally continued in the longitudinal direction.

With this structure, in addition to the effects of the aforementioned Item [4], since the plurality of slit-shaped removed portions are formed from the connecting piece portion to the shifting piece portion over approximately the entire width thereof, the removed portions absorb the longitudinal compressive strain and/or the compressive stress generated from the connecting piece portion to the shifting piece portion. Therefore, even if the belt molding is mounted along the curve, the elastic repulsive member can be curved along the curve in a favorable manner, which results in a smoothly continued curvature of the shifting piece portion having a predetermined curvature radius without causing local deformations of the shifting piece portion along the longitudinal direction.

[7] The belt molding for vehicles as recited in the aforementioned Item [4], wherein, at the connecting piece portion or the shifting piece portion of the elastic repulsive member, in addition to the plurality of removed portions forming one row, another plurality of removed portions forming another at least one row are arranged in a longitudinal direction at certain intervals at a position away from the one row in the widthwise direction.

With this structure, in addition to the effects of the aforementioned Item [4], since the plurality of removed portions forming one row and the plurality of removed portions forming another at least one row are formed in the connecting piece portion, the desired elastic force and elastic restoring force can be easily set to the connecting piece portion by the plurality of removed portions forming the plural rows.

[8] The belt molding for vehicles as recited in the aforementioned Item [7], wherein the one row including the plurality of removed portions and another row including another plurality of removed portions are disposed in parallel with each other.

With this structure, in addition to the effects of the aforementioned Item [7], since the plurality of removed portions forming plural rows are arranged in parallel, the desired elastic force and elastic restoring force can be easily set to the connecting piece portion.

[9] The belt molding for vehicles as recited in the aforementioned Item [7] or [8], wherein the plurality of removed portions forming the one row and the another plurality of removed portions forming another row are displaced mutually in the longitudinal direction in a staggered manner.

With this structure, in addition to the effects of the aforementioned Item [7] or [8], since the plurality of removed portions forming plural rows are displaced mutually in the longitudinal direction in a staggered manner, the desired elastic force and elastic restoring force can be evenly set to the connecting piece portion along the entire length in the longitudinal direction.

[10] The belt molding for vehicles as recited in any one of the aforementioned Items [7] to [9], wherein at least one of the plurality of removed portions is formed into an oval shape elongated in the longitudinal direction.

With this structure, in addition to the effects of any one of the aforementioned Items [7] to [9], since the plurality of removed portions forming one row are formed into an oval shape elongated in the longitudinal direction at predetermined intervals in the longitudinal direction of the connecting piece portion, the number of removed portions can be reduced, resulting in an easy processing.

[11] The belt molding for vehicles as recited in any one of the aforementioned Items [4] to [10], wherein the plurality of removed portions are formed at the same intervals in the longitudinal direction.

With this structure, in addition to the effects of any one of the aforementioned Items [4] to [10], the desired elastic force and elastic restoring force can be evenly set to the connecting piece portion along the entire length in the longitudinal direction.

[12] The belt molding for vehicles as recited in any one of the aforementioned Items [4] to [11], wherein a total longitudinal length of the plurality of removed portions forming one row in the longitudinal direction is set to 10% or more but not exceeding 90% of an entire length of the connecting piece portion.

With this structure, in addition to the effects of any one of the aforementioned Items [4] to [11], the elastic repulsive member can be formed of a commercially available commonly used material considering the handling nature and the formability. That is, considering the handling nature and the formability of the plate-shaped material for the elastic repulsive member, it is preferable to use a relatively thick metal plate material. However, if the elastic restoring force is excessively large, by increasing the rate of the removed portions of the connecting piece portion, the elastic restoring force can be adjusted appropriately

[13] The belt molding for vehicles as recited in any one of the aforementioned Items [1] to [12], wherein, at at least a widthwise tip edge of the shifting piece portion, a reinforcing portion thicker than a thickness of the other portion of the shifting piece portion is formed continuously in the longitudinal direction.

With this structure, in addition to the effects of any one of the aforementioned Items [1] to [12], since the widthwise tip end edge of the shifting piece portion is increased in thickness so as to have a thickness thicker than the other portion to thereby form a reinforcing portion, even if an external force is applied to the shifting piece portion, the widthwise tip end edge can maintain the smoothly continued linear shape in the longitudinal direction without causing unexpected local deformation of the widthwise tip end edge. Therefore, unexpected local deformation will not be generated at the tip end side of the seal lip, which does not cause uneven wiping performance at the portion where the elastic repulsive member exists during the use of the belt molding. When the elastic repulsive member is formed by press forming or roll forming, the reinforcing portion can be easily formed into a folded back hem shape. In cases where the elastic repulsive member is formed of a synthetic resin, if the elastic repulsive member is formed by injection molding, it can be easily formed by enlarging the forming cavity space as compared with the other portion. If it is formed by extrusion molding, it can be easily formed by increasing the distance of the orifices.

[14] The belt molding for vehicles as recited in any one of the aforementioned Items [1] to [13], wherein a tip end side of the shifting piece portion of the elastic repulsive member is embedded in the seal lip along a longitudinal direction of the seal lip and integrally formed with the seal lip.

With this structure, in addition to the effects of any one of the aforementioned Items [1] to [13], since the tip end side of the shifting piece portion of the elastic repulsive member is embedded in the seal lip along the longitudinal direction of the seal lip, the shifting piece portion is integrally formed with the seal lip, which effectively transmits the elastic restoring force to the seal lip and prevents unexpected detachment therefrom. Furthermore, embedding the shifting piece portion in the seal lip can be easily performed by a complex extrusion in extruding, e.g., the seal lip.

[15] The belt molding for vehicles as recited in any one of the aforementioned Items [1] to [14], wherein the fixed piece portion of the elastic repulsive member is fixed to the engage wall portion with a fastening means.

With this structure, in addition to the effects of any one of the aforementioned Items [1] to [14], since the fixed piece portion of the elastic repulsive member is fixed to the engage wall portion with a fastening means (e.g., rivetting of a metal rivet or a resin rivet, screws), the elastic repulsive member can be fixed to the engage wall portion assuredly, resulting in secured fixing of the elastic repulsive member to the engaging wall portion in a stable manner. This enables effective and stable transmission of the elastic restoring force to the seal lip. In using a rivet, it is preferable to use a blind rivet capable of rivetting operation from its one side.

[16] The belt molding for vehicles as recited in any one of the aforementioned Items [1] to [15], wherein the elastic repulsive member is a molded article of an elastic synthetic resin being higher in hardness, rigidity and spring nature than the elastic polymer material of the seal lip.

With this structure, in addition to the effects of any one of the aforementioned Items [1] to [15], the elastic repulsive member can be easily formed at a low cost by injection molding or extrusion molding, and no rust will be generated during use. As the elastic synthetic resin, polyacetal resin or polyamide resin can be preferably used.

[17] The belt molding for vehicles as recited in any one of the aforementioned Items [1] to [16], wherein the elastic repulsive member is a formed article of metal being higher in hardness, rigidity and spring nature than the elastic polymer material of the seal lip.

With this structure, in addition to the effects of any one of the aforementioned Items [1] to [16], the elastic repulsive member including a metal plate having a spring characteristic can be preferably used since the elastic repulsive member would cause almost no creep deformation at the temperature range (−30° C. to 80° C.) in which the belt molding is normally used and the elastic repulsive member returns to its original shape almost immediately when a load is released.

[18] The belt molding for vehicles as recited in the aforementioned Item [17], wherein the metal plate is one of metal spring plates selected from the group consisting of a stainless steel spring plate, a rust prevention treated carbon steel spring plate, a titan alloy spring plate, a cupper alloy spring plate and an aluminum alloy spring plate.

With this structure, in addition to the effects of the aforementioned Item [17], the stainless steel spring plate, the rust prevention treated carbon steel spring plate, the titan alloy spring pate, the cupper alloy spring plate and the aluminum alloy spring plate can be easily obtained, and are rust-free. Therefore, the elastic restoring force can be stably maintained for a long term.

[19] The belt molding for vehicles as recited in the aforementioned Item [17] or [18], wherein the metal plate falls within the range of 0.01 mm to 0.50 mm in thickness.

With this structure, in addition to the effects of the aforementioned Item [17] or [18], the elastic repulsive member can be easily formed using the metal plate having a thickness of 0.01 mm to 0.50 mm by normal plastic forming (e.g., press forming, roll forming) without requiring special techniques.

[20] The belt molding for vehicles as recited in the aforementioned Item [19], wherein the metal plate falls within the range of 0.05 mm to 0.25 mm in thickness.

With this structure, in addition to the effects of the aforementioned Item [19], by forming the elastic repulsive member from the metal plate having a thickness of 0.05 mm to 0.25 mm, the handing nature can be enhanced and the elastic repulsive member can be formed more easily.

[21] The belt molding for vehicles as recited in any one of the aforementioned Items [1] to [20], wherein two seal lips are formed on the engage wall portion at a certain interval along a moving direction of the window pane, and wherein the shifting piece portion is engaged with or integrally formed with at least a lower side seal lip.

With this structure, in addition to the effects of any one of the aforementioned Items [1] to [20], since the elastic repulsive member is concealed with the upper side seal lip, the elastic repulsive member cannot be seen from the outside, which does not cause deterioration of the ornamental nature. Furthermore, the wiping performance can be further improved by the two seal lips.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the present invention will be described by way of example and not limitation. It should be understood based on this disclosure that various other modifications can be made by those in the art based on these illustrated embodiments.

First Embodiment

An outer belt molding according to a first embodiment of the present invention will be explained with reference to FIGS. 1 to 5.

Figure 1:
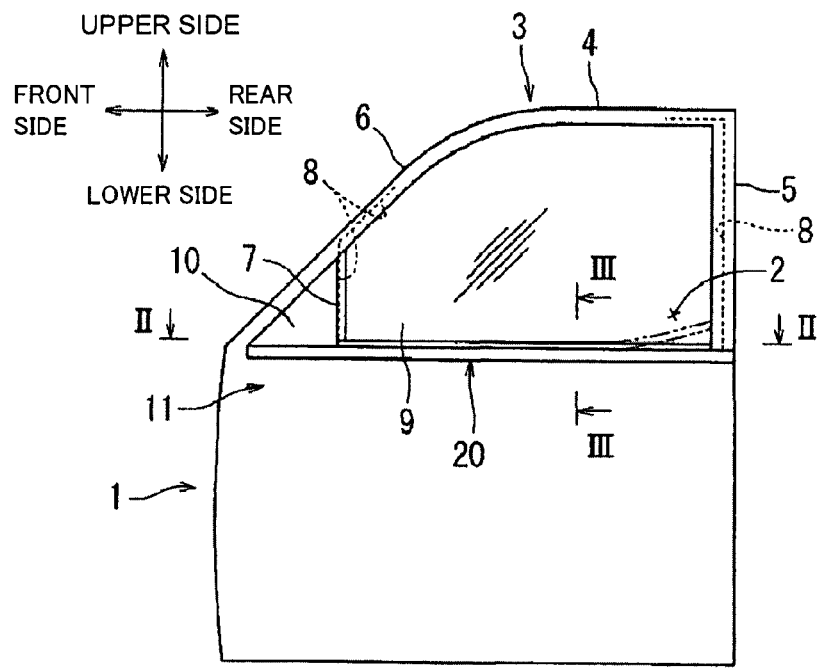
FIG. 1 is a side view showing the state in which a belt molding for vehicles according to a first embodiment of the present invention is mounted to a flange portion of a door outer panel as a mounting member.
Figure 2:
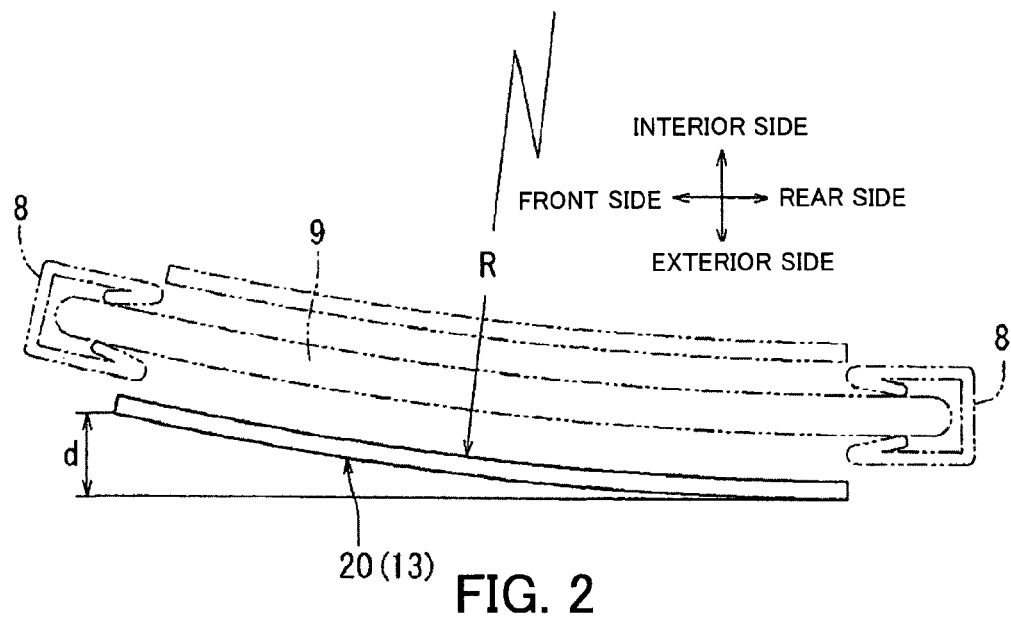
FIG. 2 is a cross-sectional view taken along the line II-II in FIG. 1.
Figure 3:
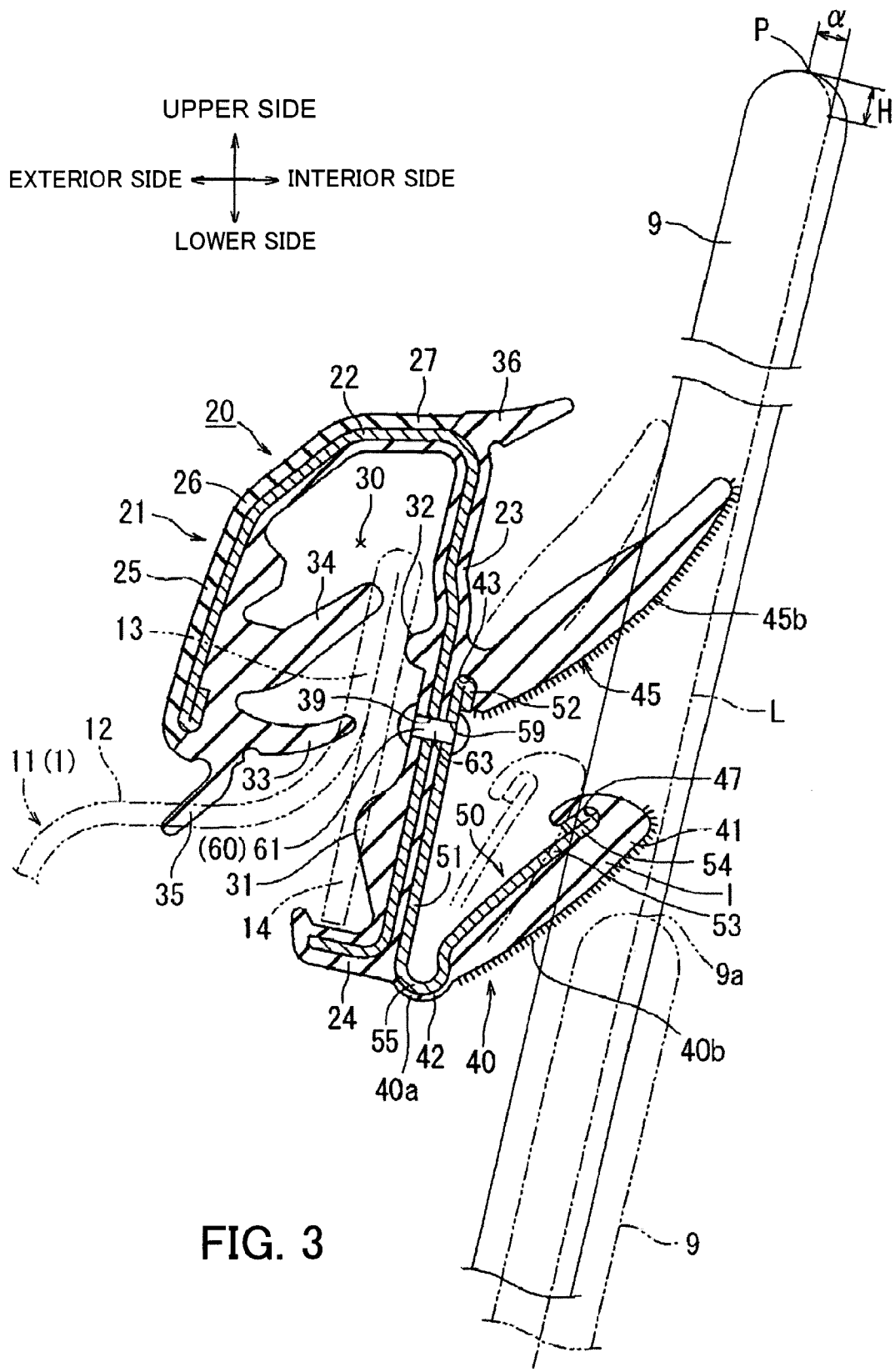
FIG. 3 is an enlarged cross-sectional view taken along the line III-III in FIG. 1.
Figure 4:
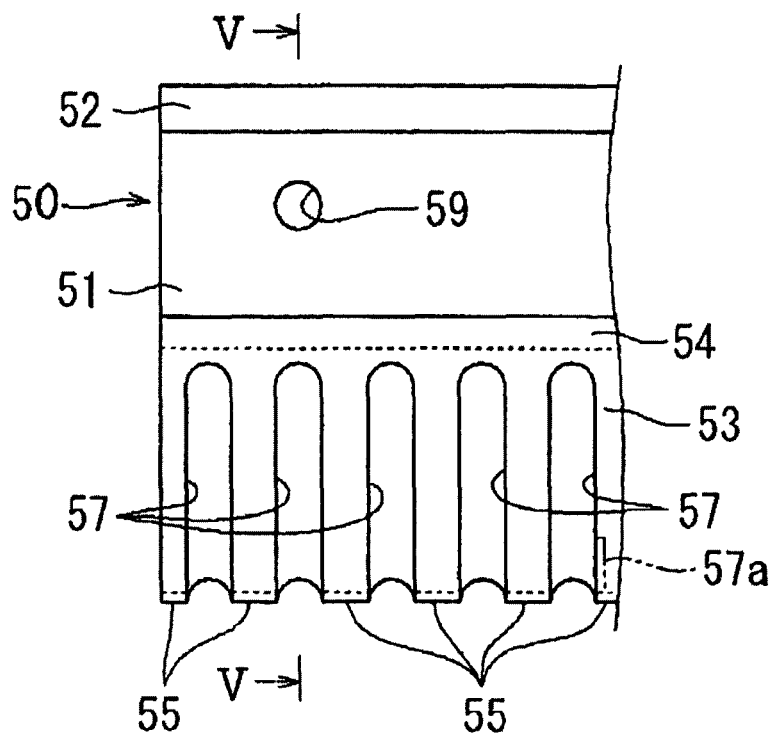
FIG. 4 is a front view showing an elastic repulsive member of the belt molding.
Figure 5:
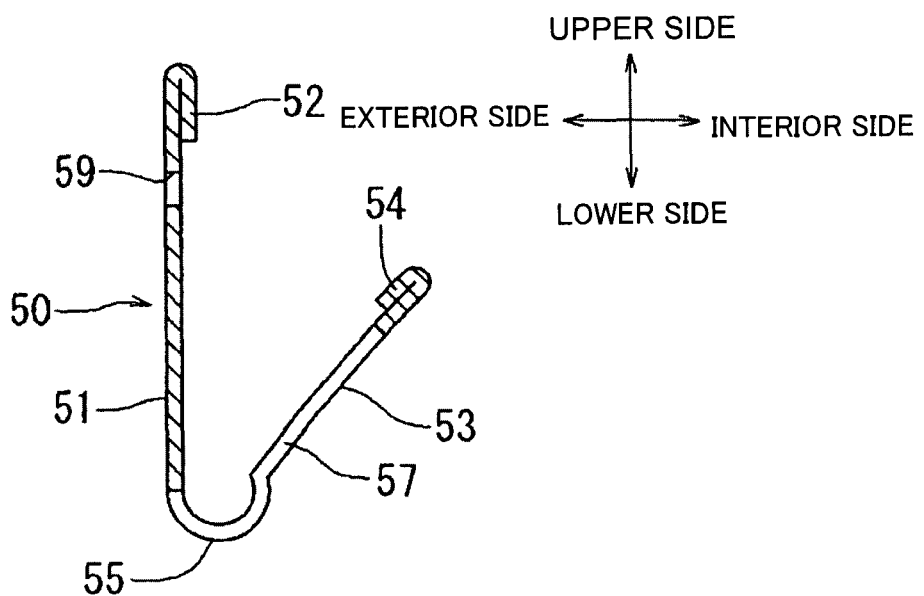
FIG. 5 is a cross-sectional view taken along the line V-V in FIG. 4.

FIG. 1 is a side view showing the state in which a belt molding for vehicles according to a first embodiment of the present invention is mounted to a flange portion of a door outer panel as a mounting member. FIG. 2 is a cross-sectional view taken along the line II-II in FIG. 1. FIG. 3 is an enlarged cross-sectional view taken along the line III-III in FIG. 1. FIG. 4 is a front view showing an elastic repulsive member of the belt molding. FIG. 5 is a cross-sectional view taken along the line V-V in FIG. 4.

As shown in FIG. 1, the door outer panel 11 of the vehicle door 1 is provided with a window frame 3 integrally having an upper frame 4, a rear vertical frame 5, and an inclined front frame 6 constituting a window opening 2. In the window frame 3, a glass run channel 8 for guiding a window pane 9 for the open-close (up-and-down) movement is fitted.

As shown in FIG. 2, the door outer panel 11 and the flange portion 13 of the upper edge of the door outer panel 11 are curved at a predetermined curvature radius (in the case of a normal vehicle, the curvature radius R ranges from 5 meters to a ten and several meters) centering about the position in the vehicle inside so that the rear vertical frame 5 takes the outermost position to protrude outwardly in a direction perpendicular to the front-and-rear direction of the vehicle in a state in which the door 1 is mounted on the vehicle. More specifically, in the front door 1, the flange portion 13 is curved at a constant radius R toward the vehicle inside as it advances to the vehicle front side with respect to the rear vertical frame 5, so that a dimensional difference d is formed between the flange portion 13 and the rear vertical frame 5 at the front side of the flange portion 13. The window pane 19 is preliminarily formed into a curved surface corresponding to the aforementioned curvature.

In some cases, the belt molding 20 to be mounted to the flange portion 13 is formed into a straight shape, and is mounted to the flange portion 13 so as to follow the aforementioned curvature within the elastic deformation thereof at the time of mounting to the flange portion 13. In other cases, the belt molding 20 formed into a straight shape is preliminarily curved before mounting to the flange portion 13, and then the curved belt molding is mounted to the flange portion 13.

As a result, in either case, longitudinal tensile stress and/or stretch occurs at the vehicle exterior side of the mounted vehicle molding 20 with respect to the bending neutral line of the belt molding 20, and compressive stress and/or compressive strain occurs in the longitudinal direction at the vehicle interior side of the mounted vehicle molding 20. The stress and/or strain becomes maximum at the outermost portion (vehicle exterior side portion) of the belt molding 20 and the innermost portion (vehicle interior side portion) thereof.

In a vehicle in which a part of the flange portion 13 in the longitudinal direction is curved smoothly upward as shown by the two-dot chain line as shown in FIG. 1 from the viewpoint of the appearance, when the belt molding 20 is mounted along the flange portion 13, tensile stress and/or stretch occurs at the lower side of the belt molding 20 and compressive stress and/or compressive strain occurs at the upper side of the belt molding 20 for the same reasons as mentioned above. FIG. 1 illustrates the left side of the front door.

As shown in FIG. 3, the flange portion 13 as a mounting member is integrally formed along the upper edge portion of the door outer panel 11. This flange portion 13 is provided with a reinforcing folded back portion 14 extended from the upper end of the flange portion 13 in a downwardly folded back manner. The flange portion 13 is disposed with a predetermined space between the flange portion 13 and the window pane 9 opened or closed (moved up and down) along the plane direction.

In the door 1, an opening and closing mechanism for opening and closing the window pane 9 along the plane direction, such as, e.g., typically an electric window regulator, a motor, etc. (not illustrated), is mounted.

The window pane 9 is intentionally configured such that the window pane 9 is moved on the opening and closing movement locus (moving locus) L as shown by the one-dot chain line shown in FIG. 3 and then outwardly shifted by a predetermined amount of displacement α at between the position immediately before arriving the upper dead center P (i.e., a position lower than the position of the upper dead center P by the amount corresponding to the height H) and the upper dead center P.

Furthermore, even in cases where the window pane 9 is not intentionally configured as mentioned above, in some cases, the window pane 9 is moved while displacing at irregular positions between the position shown by the two-dot chain line and the position shown by the solid line in FIG. 3 during the opening and closing movements due to shape errors, mounting errors, errors of an opening and closing mechanism, or these cumulative errors.

Hereinafter, the former structure intentionally configured as mentioned above will be explained as one example.

As shown in FIGS. 1 to 3, the vehicle exterior side belt molding 20 is provided with a long belt molding attaching member 21 (hereinafter referred to as "belt molding attaching member" or simply as "attaching member"), long first and second seal lips 40 and 45 made of a soft elastic polymer material and protruded from the attaching member so that it can be brought into elastic contact with the vehicle exterior side surface (hereinafter simply referred to as "surface") of the window pane 9, and an elastic repulsive member 50.

This attaching member 21 is capable of being attached to the flange portion 13 as a mounting member, and is formed of or integrally formed with a rigid material.

In this first embodiment, the attaching member 21 is formed by extruding a soft elastic polymer material into a long member having approximately an inverted U-shape in cross-section including inner and outer or first and second engage wall portions 23 and 25 to be engaged with the flange portion 13 and a connecting wall portion 27 integrally connecting the upper ends of the first and second engage wall portions 23 and 25. Thus, the attaching member 21 has an attaching groove 30 opening downward. The first and second engage wall portions 23 and 25 and the connecting wall portion 27 of the attaching member 21 have a core member 22 having rigidity, such as, e.g., a steel plate, embedded therein.

At upper and lower portions of the surface of the first engage wall portion 23 among opposed surfaces of the first and second engage wall portions 23 and 25 of the attaching member 21, large and small protruding portions 31 and 32 as attaching means protruded toward the attaching groove 30 and extended in a longitudinal direction are formed. Furthermore, at upper and lower portions of the surface of the second engage wall portion 25, holding lips 33 and 34 as the other attaching means are formed in a manner such that they are inclined toward the inner side of the attaching groove 30. The holding lips 33 and 35 are configured to hold the flange portion 13 in cooperation with the large and small protruding portions 31 and 32 extending in the longitudinal direction. In cases where the second engage wall portion 25 and the connecting wall portion 27 of the attaching member 21 are required to have metallic luster from the viewpoint of formative requirements, the purpose can be attained by using a luster stainless metal plate or aluminum plate as the core member 22 and exposing the surface of the core member 22 without forming a surface cover layer 26 thereon.

Furthermore, at the lower end of the first engage wall portion 23, an engage portion 24 capable of being engaged with the lower end of the folded-back portion 14 of the flange portion 13 is formed. On the other hand, at the lower end of the second engage wall portion 25, an exterior seal lip 35 configured to be brought into elastic contact with the bottom portion 12 of the flange portion 13 is formed.

The attaching member 21 is mounted to the flange portion 13 with the upper edge of the flange portion 13 inserted in the attaching groove 30. In this state, the large and small protruding portions 31 and 32 and the holding lips 33 and 34 hold the flange portion 13 from both sides thereof, and the engage portion 24 is engaged with the lower end of the folded-back portion 14 to thereby retain the attaching member 21.

Furthermore, at the vehicle exterior side surface of the second engage wall portion 25, a surface cover layer 26 made of a hard polymer material is formed. Furthermore, at the portion of the window pane 9 side of the top surface of the connecting wall portion 27, a concealing lip 36 protruded toward the surface of the window pane 9 is formed.

As shown in FIG. 3, the long first and second seal lips 40 and 45 are formed by extruding a soft elastic polymer material, such as, e.g., thermoplastic elastomer or rubber, in such a manner that they integrally protrude from the surface of the first engage wall portion 23 of the attaching member 21 opposed to the surface of the window pane 9 in parallel at a predetermined distance from each other in the up-and-down direction so that the seal lips 40 and 45 can be brought into elastic contact with the surface of the window pane 9.

The base portion 40a where the first seal lip 40 is connected to the first engage wall portion 23 is integrally connected to the lower end portion of the first engage wall portion 23 of the attaching member 21 by a connecting portion 42 thinner than the other portion of the seal lip 40. Thinning down the base portion 40a as mentioned above is advantageous in that it is possible to weaken the permanent set and/or the creep deformation generated in the base portion 40a to act against the elastic restoring force of the elastic repulsive member 50 as a reaction force.

In cases where the thin connecting portion 42 causes technical problems in thinning the base portion 40a at the belt molding production step, the aforementioned reaction force can be reduced by forming the based portion 40a to have a thickness which does not cause any problems and then forming a plurality of slit-like removed portions in the base portion 40a along the longitudinal direction. The removed portions can be formed to have the same or similar structure as that of a connecting piece portion 55 mentioned later in the similar method.

As shown in FIG. 3, the first engage wall portion 23 and the lower first seal lip 40 of the attaching member 21 have engaging portions on opposed surfaces thereof. In the first embodiment, recess grooves for engagement 43 and 47 (corresponding to the engaging portion of the present invention) are formed at the position of the first engage wall portion 23 corresponding to the lower side of the base portion of the upper second seal lip 45 and at the vicinity of the tip end portion of the first seal lip 40, respectively. It is configured such that a folded back portion 52 located at the widthwise tip end of a fixed piece portion 51 of a separately formed long elastic repulsive member 50 approximately V-shape in cross-section, which will be detailed later, can be engaged with the recess 43 for engagement of the first engage wall portion 23 and that the folded back portion 54 located at the widthwise tip end of a shifting piece portion 53 of the elastic repulsive member 50 can be engaged with the recess 47 for engagement of the first seal lip 40.

In this first embodiment, the first and second engage wall portions 23 and 25, the connecting wall portion 27, the large and small protruding portions 31 and 32, the holding lips 33 and 34, the concealing lip 36, and the first and second seal lips 40 and 45 are integrally formed by extruding an elastically deformable soft elastic polymer material, such as, e.g., thermoplastic elastomer, and the surface cover layer 26 made from a hard polymer material harder than the soft polymer material is formed by a coextrusion simultaneously performed by the extrusion of the soft polymer material. In FIG. 3, on the surfaces of the first and second seal lips 40 and 45 facing the window pane 9 among the surfaces of the first and second seal lips, flocking of nylon piles or a low frictional material layer 40b and 45b made from a material smaller than the elastic polymer of the seal lips in friction coefficient to reduce the sliding resistance to the window pane 9.

As shown in FIG. 3, between the first engage wall portion 23 of the attaching member 21 and the first seal lip 40, a long elastic repulsive member 50, which is higher than the soft elastic polymer material in creep deformation resistance nature, larger than that in elastic restoring speed, and formed into an approximately V-shape in cross-section, is arranged. The elastic repulsive member 50 is preferably formed to have a length nearly equal to the longitudinal length of the first seal lip 40 so as to generate an elastic restoring force along the entire length of the first seal lip 40.

This elastic repulsive member 50 includes a fixed piece portion 51 fixed to the first engage wall portion 23, the shifting piece portion 53 engaged with the first seal lip 40 to urge the lip 40 toward the surface of the window pane 9, and a connecting piece portion 55 disposed between the fixed piece portion 51 and the shifting piece portion 53 to integrally connect these fixed piece portion 51 and shifting piece portion 53 in a continuous manner, and is formed to have an approximately V-shape in cross-section.

The fixed piece portion 51 and the shifting piece portion 53 of the elastic repulsive member 50 are formed such that, when the fixed piece portion 51 is disposed along the first engage wall portion 23, the shifting piece portion 53 takes approximately the same position as that of the first seal lip 40 in a state of nature (the position before being shifted), or overlaps with the first seal lip 40. Furthermore, for the purpose of further increasing the elastically deformable amount of the connecting piece portion 55, the connecting piece portion 55 is formed into a circular arc shape (circular arc shape having an open angle exceeding 180 degrees) in cross-section bulged outward of the cross position defined by two straight lines extending from the fixed piece portion 51 and the shifting piece portion 53. With this, the substantial widthwise length of the connecting piece portion 55 can be increased, and also it becomes possible to prevent excessive bending stress from being generated in the connecting piece portion 55.

In this first embodiment, the elastic repulsive member 50 is formed of a hard and stiff metal plate higher than the soft polymer material of the first seal lip 40 in creep deformation resistance nature and having spring nature. In the case of a metal plate, the creep deformation can be essentially neglected within the temperature range (about −30° C. to 80° C.) at which the belt molding is used.

As shown in FIGS. 4 and 5, the fixed piece portion 51 of the elastic repulsive member 50 is formed into a flat plate shape, and at least the connecting piece portion 55 is provided with a plurality of removed portions 57 (the removed portion can be, for example, a circular hole, an oval hole, or a slit, but not limited thereto) arranged at certain intervals in the longitudinal direction to form at least one row.

In this first embodiment, the plurality of removed portions 57 are each formed into a slit extending in the widthwise direction. The removed portions 57 having the same shape are preferably arranged at certain intervals, more preferably at the same pitch, in the longitudinal direction. Forming the removed portions 57 at the same pitch can exert the repulsion force of the shifting piece portion 53 evenly along the entire length of the shifting piece portion 53.

The plurality of removed portions 57 can be formed only in the connecting piece portion 55. More preferably, however, the plurality of removed portions 57 can be formed continuously from the connecting piece portion 55 up to the vicinity of the tip end portion of the shifting piece portion 53 except for the widthwise tip end portion thereof with the widthwise tip end portion of the shifting piece portion 53 continuously extending in the longitudinal direction. The removed portion 57 is preferably formed to have an elongated hole with semi-circular both end portions at the widthwise end sides of the elastic repulsive member 50. With this, even if the shifting piece portion 53 is repeatedly displaced, no stress concentration occurs, which in turn can prevent damage or breakage of the shifting piece portion 53.

It is preferable that the total longitudinal length of the plurality of removed portions 57 is set to 10% or more but not exceeding 90% of the length of the connecting piece portion 50 before forming the plurality of removed portion 57. In cases where the elastic restoring force of the elastic repulsive member 50 with removed portions excessively increases the sliding resistance between the seal lip 40 and the moving window pane 9, various adjustments, such as, e.g., increasing the aforementioned percentage to reduce the elastic restoring force, can be performed. The same function as mentioned above can be obtained by forming enlarging removed portion 57a enlarged in the longitudinal direction as shown by the two-dot chain line in FIG. 4 in place of the above.

The removed portions 57 can be easily formed by press working, such as, e.g., blanking, or laser welding when the elastic repulsive member 50 is a metal plate formed article, by injection molding when the elastic repulsive member 50 is an injection-molded article, or by the same method as the method employed in the case of a metal plate when the elastic repulsive member 50 is an extruded article.

At a widthwise tip end edge of at least the shifting piece portion 53 of the elastic repulsive member 50, a reinforcing folded back portion 54 bent in a folded-back manner is formed. In the first embodiment, at the widthwise tip end edge of the fixed piece portion 51 and the widthwise tip end edge of the shifting piece portion 53, reinforcing folded back portions 52 and 54 bent in a folded-back manner are formed, respectively.

By forming the folded back portion 52 with a rounded tip end at the widthwise tip end of the fixed piece portion 51 of the elastic repulsive member 50, the widthwise tip end of the fixed piece portion 51 is reinforced by the thickness-increased portion thicker than the other portion. This increased rigidity of the widthwise tip end enhances the fixing stability of the fixed piece portion 51 to the first engage wall portion 23.

Furthermore, in forming the elastic repulsive member 50 by press forming from a flat plate or plastic forming, such as, e.g., roll forming, from a strip material, the reinforcing prevents the widthwise tip end edge from being irregularly deformed in the longitudinal direction, which enables forming of a smoothly continued linear or curved shape.

By forming the folded back portion 54 with a rounded tip end at the widthwise tip end of the shifting piece portion 53, the widthwise tip end of the shifting piece portion 53 is reinforced by the thickness-increased portion thicker than the other portion.

With this, when the widthwise tip end edge of the shifting piece portion 53 is engaged with the recess groove for engagement 47 of the first seal lip 40, the widthwise tip end edge of the shifting piece portion 53 does not cause irregular deformation of the first seal lip 40.

Accordingly, the tip end portion of the first seal lip 40 is not deformed in the longitudinal direction and can be maintained in a smoothly continued straight or curved line. Furthermore, the rounded tip end of the shifting piece portion 53 does not cause abrasion of the inside of the engaging recess groove 47 of the first seal lip 40 by the repeated displacements during use with the tip end engaged with the engaging recess groove 47. This prevents generation of a gap or a shake between the engaging recess groove 47 and the tip end of the shifting piece portion 53, which effectively transfers the elastic restoring force of the shifting piece portion 53 to the first seal lip 40.

The metal plate forming the elastic repulsive member 50 is preferably one of a stainless steel spring plate, a rust-prevention treated carbon steel spring plate, a titan alloy spring plate, a copper alloy spring plate, and an aluminum alloy spring plate, which can resist rust and exert stable elastic restoring force within a practical service temperature range.

The elastic repulsive member 50 is preferably formed of a metal plate having a thickness falling within the range of 0.01 mm to 0.50 mm. Within this range, the elastic repulsive member 50 can be formed by normal plastic working without requiring special plastic working of the metal plate. It is more preferable that the member 50 is formed of a metal plate having a thickness of 0.05 mm to 0.25 mm. This range is preferable from the viewpoint of handling nature in performing the plastic working and good workability in attaching the elastic repulsive member 50 to the attaching member 21.

In place of a metal plate formed article, the elastic repulsive member 50 can be a formed article made from an elastic synthetic resin material larger in hardness and also larger in rigidity and elastic restoring speed than the elastic polymer material of the first seal lip 40. Examples of synthetic resin materials for forming such a synthetic resin formed article include, for example, polyacetal resin and polyamide resin used for snap-on type clips or the like. It is more preferable to use materials further enhanced in the elastic restoring speed and/or the thermal stability by further mixing fibers, such as, e.g., glass fibers, carbon fibers, or boron short fibers, in the aforementioned resin material.

In the case of forming the elastic repulsive member 50 using the synthetic resin material as mentioned above, a conventionally available injection molding or extrusion molding can be employed.

As shown in FIG. 3, the elastic repulsive member 50 formed as mentioned above is disposed between the first fixed wall portion 23 and the first seal lip 40 by inserting the tip end fold back portion 52 of the fixed piece portion 51 into the engaging recess groove 43 to be engaged therewith and also inserting the tip end folded back portion 54 of the shifting piece portion 53 into the engaging recess groove 47 of the first seal lip 40 to be engaged therewith with the connecting piece portion 55 positioned on the base portion 40a of the first seal lip 40.

In this arrangement state of the elastic repulsive member 50, the shifting piece portion 53 is disposed on the upper surface of the first seal lip 40, and the exterior surface of the connecting piece portion 55 is disposed on the thin connecting portion 42 forming the base portion 40a of the first seal lip 40.

Furthermore, in this first embodiment, at least a part of the fixed piece portion 51 of the elastic repulsive member 50 is fixed to the first engage wall portion 23 by bringing the fixed piece portion 51 into press-contact with the first engage wall portion 23 with a fastener 60 as fastening means.

In this first embodiment, as the fastener 60, a metal or hard synthetic resin rivet 61 is used. A plurality of through holes 39 and 59 for inserting the axis portion 63 of the rivet 61 are formed in a penetrated manner at certain intervals in the longitudinal direction in the first engage wall portion 23 of the attaching member 21 and the fixed piece portion 51 of the elastic repulsive member 50 (see FIG. 3).

In detail, rivets 61 are inserted in the plurality of through holes 39 and 59 formed in the first engage wall portion 23 of the attaching member 21 and the fixed piece portion 51 of the elastic repulsive member 50 and then the tip end of the axis portion 63 is revetted. Thus, the fixed piece portion 51 of the elastic repulsivie member 50 is fixed to the first engage wall portion 23 in a press-fitted manner. The fixed piece portion 51 of the elastic repulsive member 50 is integrated with the attaching member 21 in a state in which the fixed piece potion 51 is prevented from being moved in the longitudinal direction and the moving direction (open-and-close direction) of the window pane 9 with respect to the attaching member 21. It is preferable that the rivet 61 as a fastener 60 is a blind rivet 61 capable of performing its revetting operation from one side. Furthermore, as the fastener, in place of the rivet 61, or in addition to the rivet 61, a tapping screw, etc., can be used.

Meanwhile, in a state in which the tip end folded back portion 54 of the shifting piece portion 53 of the elastic repulsive member 50 is engaged with the engaging recess groove 47 of the first seal lip 40, the elastic restoring force of the connecting piece portion 55 of the elastic repulsive member 50 or the cooperative function of the connecting piece portion 55 and the elastic polymer material of the seal lip 40 urges the first seal lip 40 toward the surface of the window pane 9 constantly.

In a state in which the belt molding 20 for vehicles is mounted to the flange portion 13 as a mounting member, when the first seal lip 40 is brought into elastic contact with the exterior surface of the window pane 9 by the movement of the window pane 9 in the window closing direction and when the distance between the first engage wall portion 23 of the attaching member 21 and the exterior surface of the window pane 9 is increased by the movement of the window pane 9 in the window opening direction (like the positions of the window pane 9 shown by the two-dot chain line in FIG. 3, when the distance is increased by a predetermined amount α when the window pane 9 is moved downward to the position lower from the upper dead center P by an amount corresponding to the height H, and when the distance is increased by the aforementioned errors during the movement of the window pane 9), the elastic restoring force of the connecting piece portion 55 of the elastic repulsive member 50 causes the elastic restoring of the contacting portion 41 of the first seal lip 40 in contact with the exterior surface of the window pane 9 in the thickness direction of the window pane 9 at a speed exceeding the restoring speed of the elastic polymer material.

In a free state in which the window pane 9 is in an opened state as shown by the two-dot chain line in FIG. 3 and the first seal lip 40 is not in contact with the surface of the window pane 9 (in a state in which the upper end 9a of the window pane 9 is away from the contacting portion 41 of the first seal lip 40 downward), the tip end of the shifting piece portion 53 of the elastic repulsive member 50 is extended by a length sufficient to cause the contacting portion 41 of the first seal lip 40 to be shifted to the position where the contacting portion 41 crosses and overlaps with a virtual plane 1 extending from the exterior surface of the window pane 9.

The belt molding for vehicles 20 according to this first embodiment is constituted as mentioned above.

Accordingly, in a state in which the belt molding for vehicles 20 is mounted to the flange portion 13 of the door outer panel 11 with the attaching member 21 as shown in FIG. 3, when the window pane 9 is in the window closed state or is moved up and down, the first seal lip 40 is urged toward the surface of the window pane 9 by the elastic restoring force of the connecting piece portion 55 of the elastic repulsive member 50 or the cooperative function of the connecting piece portion 55 and the elastic polymer material of the seal lip 40.

The distance between the first engage wall portion 23 and the external surface of the window pane 9 is increased by the function of the raising and lowering mechanism of the window pane 9 or errors due to the raising or lowering movement of the window pane 9. More specifically, in the case of arising from the function of the raising and lowering mechanism, as shown in FIG. 3, the distance between the first engage wall portion 23 and the external surface of the window pane 9 will be increased by a predetermined amount α when the window pane 9 is moved downward to the position lower than the upper dead center P by an amount corresponding to the height H. On the other hand, in the case of arising from errors, the distance will be increased at irregular positions during the movement of the window pane 9. At this time, the elastic restoring force of the connecting piece portion 55 of the elastic repulsive member 50 causes the contacting portion 41 of the first seal lip 40 in contact with the exterior surface of the window pane 9 to be elastically returned in the thickness direction of the window pane 9 at a speed exceeding the restoring speed of the elastic polymer of the first seal lip 40. At this time, the contacting portion 41 of the first seal portion 40 follows fluctuation (enlargement) of the aforementioned distance in a preferable manner.

Thus, the elastic restoring force of the connecting piece portion 55 of the elastic repulsive member 50 can cause the first seal lip 40 to be elastically returned in a shorter time period as compared with a conventional one, which in turn can improve the wiping performance for wiping the surface of the window pane 9. Especially in cases where the elastic repulsive member 50 is made of a metal spring plate, such metal elastic repulsive member 50 enables immediate elastic restoring of the first seal lip 40.

As shown in FIGS. 1 and 2, the door outer panel 11 and the flange portion 13 of the upper edge of the door outer panel 11 are curved at a predetermined curvature radius (in the case of a normal vehicle, the curvature radius R ranges from 5 meters to a ten and several meters) centering about a vehicle inside position so that the rearmost side of the flange portion 13 approximately located at the rear vertical frame 5 takes the outermost position to protrude outwardly. Along the curvature, the aforementioned long belt molding 20 is mounted in a curved manner.

At this time, a compressive stress will be generated in the longitudinal direction at the connecting piece portion 55 positioned at the inside of the curvature radius. Even in this state, the plurality of slit-like removed portions 57 formed in the connecting piece portion 55 absorb the longitudinal compressive stress and/or compressive strain generated at the connecting piece portion 55. Accordingly, when the belt molding 20 is mounted in a curved manner along the curvature, the elastic repulsive member 50 is also curved along the curvature in a preferable manner, causing no local deformations of the connecting piece portion 55 and the shifting piece portion 53 along the longitudinal direction thereof, which results in a smoothly continued curvature of the belt molding 20 having a predetermined curvature radius.

Furthermore, the shape (dimension) and/or material of the plate-shaped material for the elastic repulsive member 50 can be increased in freedom of choice. In detail, if the sliding resistance between the first seal lip 40 and the window pane 9 is too large because of the excessively large elastic restoring force of the plate-shaped material used for the elastic repulsive member 50, the total longitudinal length of the removed portions 57 and/or the number of the removed portions 57 is adjusted to decrease the elastic restoring force so that the ratio of the total longitudinal length of the removed portions 57 to the entire length of the connecting piece portion 55 is further increased. This enables arbitrary selection of the plate-shaped material having a shape and/or material suitable in forming and handling the plate-shaped material. To the contrary, if the elastic restoring force of the elastic repulsive member 50 having the removed portions 57 is too small, the aforementioned ratio of the total longitudinal length of the removed portions 57 to the entire length of the connecting piece portion 55 is decreased, or all of the removed portions 57 are eliminated. Furthermore, forming the removed portions 57 also contributes to the weight reduction of the elastic repulsive member 50.

Figure 6:
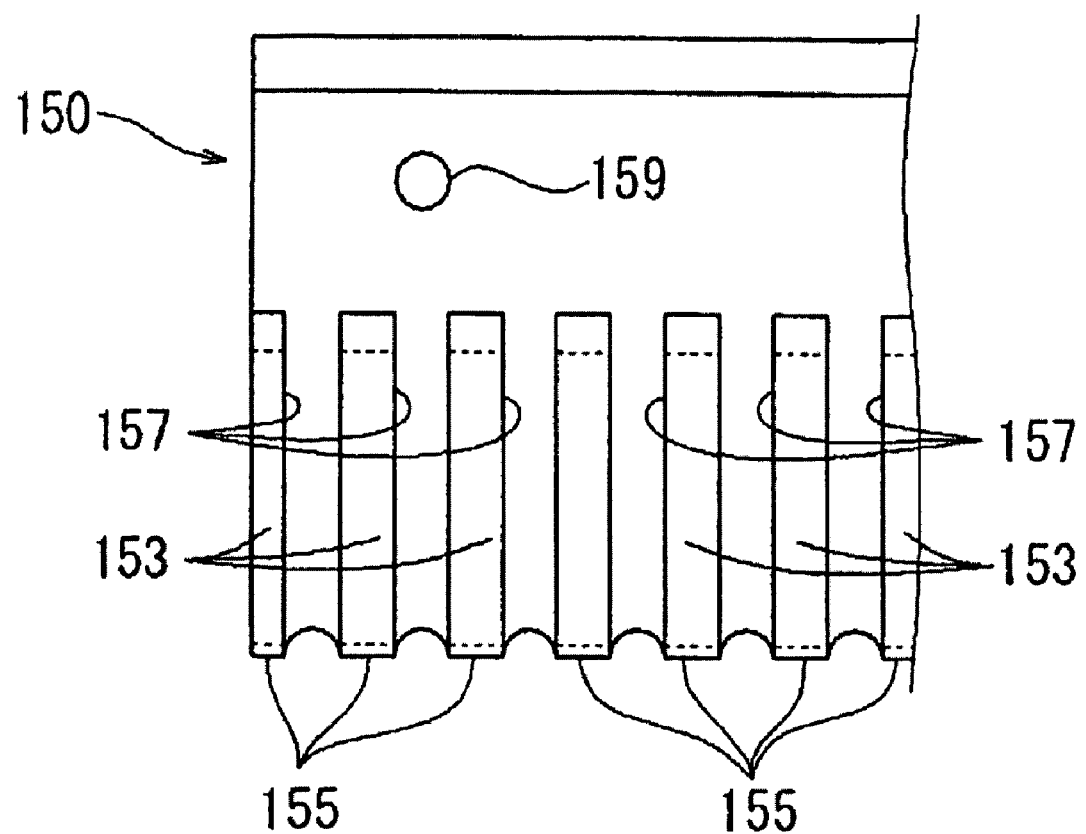
FIG. 6 is an explanatory front view showing a modification of a plurality of slit-like removed portions formed in the elastic repulsive member.

Furthermore, even if the plurality of slit-shaped removed portions 57 of the elastic repulsive member 50 of the aforementioned first embodiment is changed as shown in FIG. 6, the present invention can be carried out.

In this case, even in cases where the flange portion 13 is curved three-dimensionally such that the flange portion 13 is curved at a predetermined curvature radius with the vehicle exterior side thereof curved outwardly and the vehicle interior side thereof curved inwardly along the front-and-rear direction of the vehicle, and the flange portion 13 is curved at a predetermined curvature radius along the up-and-down direction of the vehicle, and the long belt molding 20 is mounted in a curved manner along the aforementioned curvature, since the plurality of slit-like removed portions 157 are formed over the entire width of the connecting end portion 155 and the shifting piece portion 153 as shown in FIG. 6, the removed portions 157 absorb the longitudinal compressive stress, compressive strain, tensile stress, and/or extension generated in the connecting piece portion 155 and/or the shifting piece portion 153. Therefore, when the belt molding 20 is mounted in a curved manner along the curvature, the elastic repulsive member 150 can be curved along the curvature in a preferable manner, which results in a smoothly continued curvature of the shifting piece portion 153 having a predetermined curvature radius, without causing local deformations of the shifting piece portion 153 along the longitudinal direction.

Second Embodiment

Next, a second embodiment according to the present invention will be explained with reference to FIG. 7.

Figure 7:
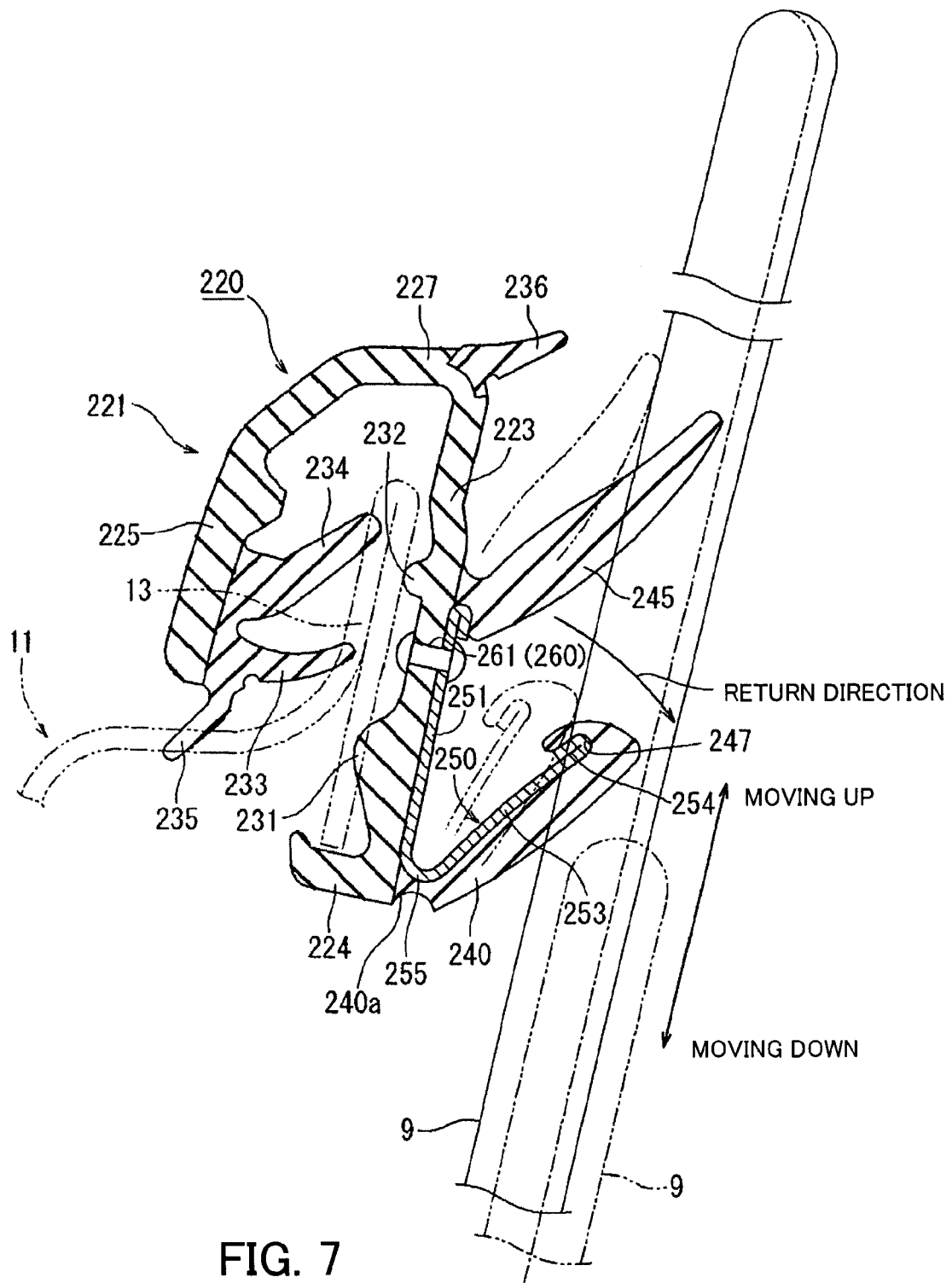
FIG. 7 is a cross-sectional view showing the state in which a belt molding for vehicles according to a second embodiment of the present invention is mounted to a flange portion of a door outer panel as a mounting member.

FIG. 7 is a cross-sectional view (corresponding to the cross-sectional view taken along the line III-III in FIG. 1) showing the state in which a belt molding for vehicles according to a second embodiment of the present invention is mounted to a flange portion of a door outer panel as a mounting member.

As shown in FIG. 7, in this second embodiment, the attaching member 221 of the belt molding for vehicles 220 capable of being attached to the flange portion 13 as a mounting member is formed of a rigid polymer material harder than the seal lip. The first and second engage wall portions 223 and 225 and the connecting wall portion 227 of the attaching member 221, large and small projecting portions 231 and 232, and the engage portion 224 are formed into a long member by extruding a hard and rigid polymer material. The holding lips 233 and 234, the exterior seal lip 235, the concealing lip 236, and the first and second seal lips 240 and 245 are formed by co-extruding a soft elastic polymer material and the hard polymer material in the same manner as in the first embodiment. The first engage wall portion 223 and the first seal lip 240 are connected with a thin base portion 240a in the same manner as in the first embodiment. The aforementioned soft polymer material and hard elastic polymer material have mutual compatibility, and are integrally welded at the respective portions in contact with each other. In this second embodiment, since the attaching member itself has rigidity, and therefore it is not always required to embed a reinforcing member therein. This is advantageous to the weight saving of the belt molding.

The elastic repulsive member 250 is the same as that in the first embodiment, and therefore the explanation will be omitted to avoid the cumulative explanation. As shown in FIG. 7, in the belt molding for vehicles 220 according to this second embodiment, reference numerals in FIG. 7 each showing the structural member/portion corresponding to that of the belt molding for vehicles 20 of the first embodiment are expressed as 2xx. In other words, in this embodiment, the corresponding reference numeral is denoted by adding "2" ahead of the reference numeral of each structural member/portion of the first embodiment.

Therefore, also in this second embodiment, in the same manner as in the first embodiment, it is possible to improve the performance of wiping the surface of the window pane 9.

Third Embodiment

Next, a third embodiment of the present invention will be explained with reference to FIGS. 8 to 10.

Figure 8:
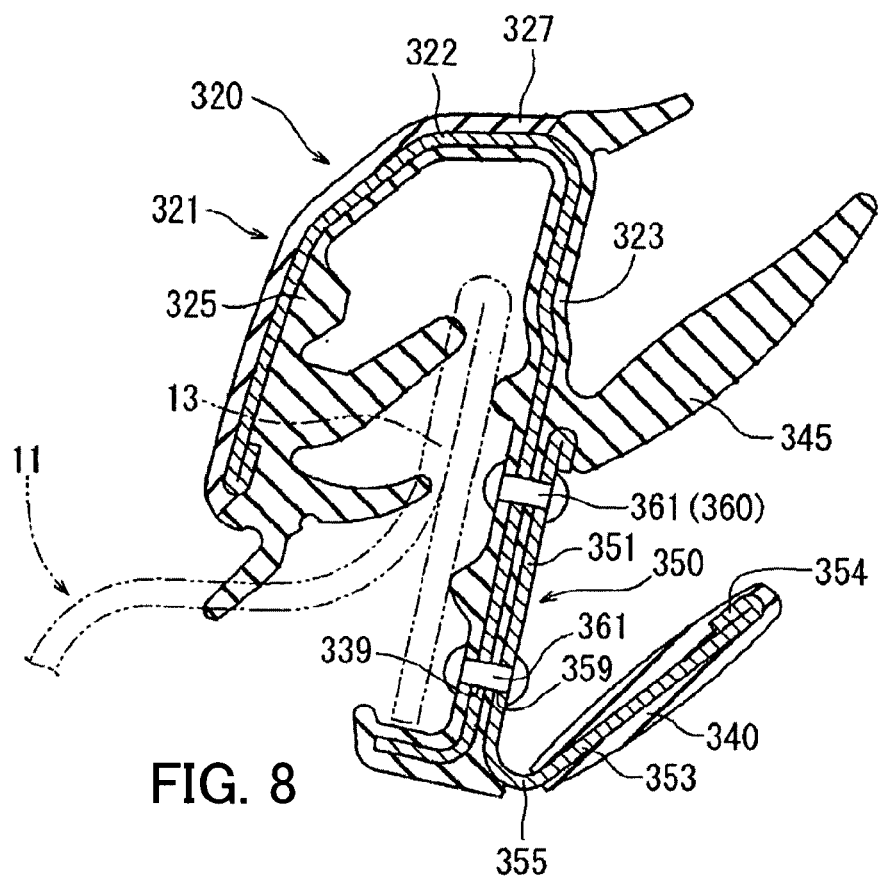
FIG. 8 is a cross-sectional view showing the state in which a belt molding for vehicles according to a third embodiment of the present invention is mounted to a flange portion of a door outer pane as a mounting member.

FIG. 8 is a cross-sectional view (corresponding to the cross-sectional view taken along the III-III in FIG. 1) showing the state in which a belt molding for vehicles according to a third embodiment of the present invention is mounted to a flange portion of a door outer panel as a mounting member, wherein the window pane is not illustrated since the structure is the same as in the first embodiment. FIG. 9 is a front view showing an elastic member of the belt molding, and FIG. 10 is a cross-sectional view taken along the line X-X in FIG. 9.

Figure 9:
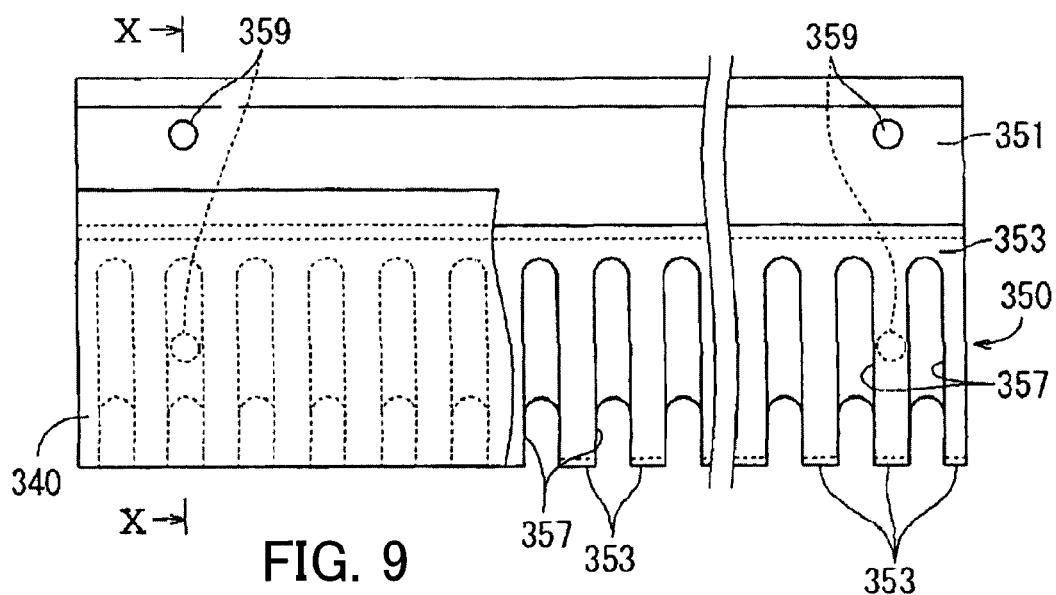
FIG. 9 is a front view showing an elastic member of the belt molding.
Figure 10:
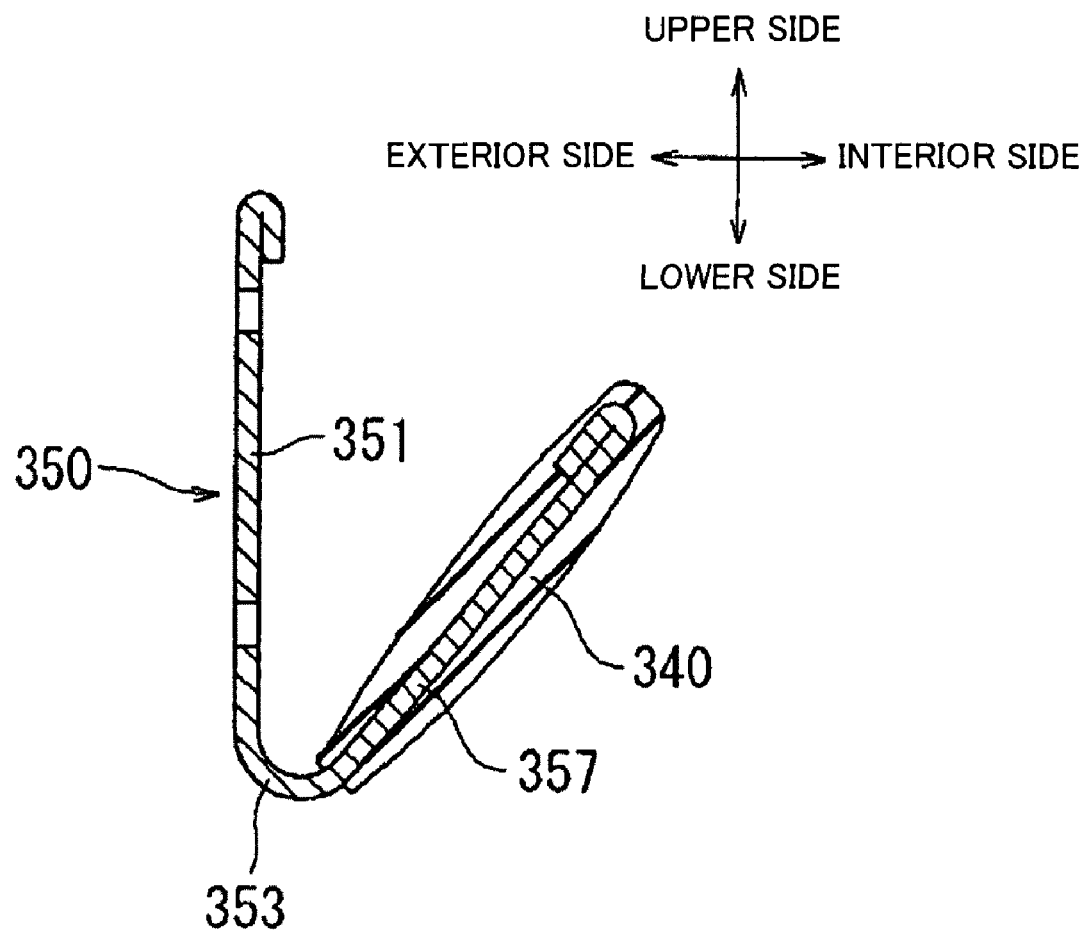
FIG. 10 is a cross-sectional view taken along the line X-X in FIG. 9.

As shown in FIGS. 8 to 10, in this third embodiment, the attaching member 321 of the belt molding for vehicles 320 capable of being attached to the flange portion 13 as a mounting member is formed by extruding a soft elastic polymer material into a member having a generally inverted U-shape in cross-section, and includes, in the same manner as in the first embodiment, the inner and outer, i.e., first and second engage wall portions 323 and 325, and a connecting wall portion 327. Inserted in the first and second engage wall portions 323 and 325 and the connecting wall portion 327 is a rigid core member 322, such as, e.g., a steel plate.

The first engage wall portion 323 of the attaching member 321 is provided with the first and second seal lip 340 and 345 at a certain distance in the movement direction (up-and-down direction) of the window pane 9. The upper side second seal lip 345 is made of a soft elastic polymer and protruded integrally from the surface of the first engage wall portion 323 opposed to the exterior surface of the window pane 9, in the same manner as in the first embodiment.

On the other hand, the first seal lip 340 is made of a soft elastic polymer material separately from the first engage wall portion 323. In the first seal lip 340, at least a part of the shifting piece portion 353 of the elastic repulsive member 350 is embedded along the longitudinal direction. As will be understood from the above, in the third embodiment, the polymer material of the first seal lip 340 is separated from the polymer material of the first engage wall portion 323 at the basal end in a non-continuous manner. Therefore, there is an advantage that the elastic restoring performance of the elastic repulsive member 350 is decided only by the characteristics of the elastic repulsive member 350 and is not influenced by the creep deformation and/or creep restoring speed of the elastic polymer material of the first seal lip 340.

Furthermore, as shown in FIG. 8, the shifting piece portion 353 of the elastic repulsive member 350 is embedded within the first seal lip 340 from the tip end folded back portion 354 to nearly the basal end. This prevents accidental contacts of the shifting piece portion 353 with the window pane 9 during use. The first seal lip 340 can be easily formed by forming a strip metal plate into an approximately V-shape in cross-section by roll forming to prepare an intermediate member of the elastic repulsive member 350 and performing coextrusion while continuously introducing the intermediate member in the extrusion die to form the first seal lip 340 integral with the intermediate member.

The elastic repulsive member 350 is formed into an approximately V-shape in cross-section including one piece as a fixed piece portion 351, the other piece as a shifting piece portion 353 and a bent portion as a connecting piece portion 355.

The fixed piece portion 351 of the elastic repulsive member 350 is fixed to the first engage wall portion 323 with a plurality of fasteners 360, such as rivets, as fastening means inserted in through holes 359 formed in the fixed piece portion 351 and through holes 339 formed in the first engage wall portion 323 and rivetted at upper and lower plural positions arranged in the longitudinal direction.

The fixed piece portion 351 of the elastic repulsive member 350 is formed into a flat plate shape, and the connecting piece portion 355 is preferably provided with the same slit-like plural removed portions 357 as in the first embodiment at certain intervals in the longitudinal direction.

The elastic repulsive member 350 is preferably formed of a metal plate as explained in the first embodiment.

The other structure of this third embodiment is the same as that of the first embodiment, and therefore the explanation will be omitted. As shown in FIGS. 8 to 10, in the belt molding for vehicles 320 according to this third embodiment, reference numerals in FIGS. 8 to 10 each showing the structural member/portion corresponding to that of the belt molding for vehicles 20 of the first embodiment are expressed as 3xx. In other words, in this embodiment, the corresponding reference numeral is denoted by adding "3" ahead of the reference numeral of each structural member/portion of the first embodiment.

Therefore, in this third embodiment, the elastic restoring force of the connecting piece portion 355 of the elastic repulsive member 350 enables quicker restoration of the first seal lip 340 as compared with a conventional one, which enables improved performance of wiping the surface of the window pane 9.

Especially, in this third embodiment, no polymer material of the first seal lip 340 exists at the portion corresponding to the connecting piece portion 355 of the elastic repulsive member 350. This does not generate a reaction force which prevents restoring of the connecting piece portion 355 of the elastic repulsive member 350, and therefore there is an advantage that the restoration characteristics of the elastic repulsive member 350 can be exerted as it is.

Furthermore, even if water and/or dirt is introduced to the connecting piece portion 355 of the elastic repulsive member 350 during use, they can be guided downward through the removed portions 357, and therefore there is an advantage that the performance degradation of the elastic repulsive member 350 by the water and/or dirt can be prevented.

Fourth Embodiment

Next, a fourth embodiment of the present invention will be explained with reference to FIGS. 11 and 12.

In this fourth embodiment, it is constituted such that the elastic restoring force of the elastic repulsive member acts on both the first and second seal lips.

Figure 11:
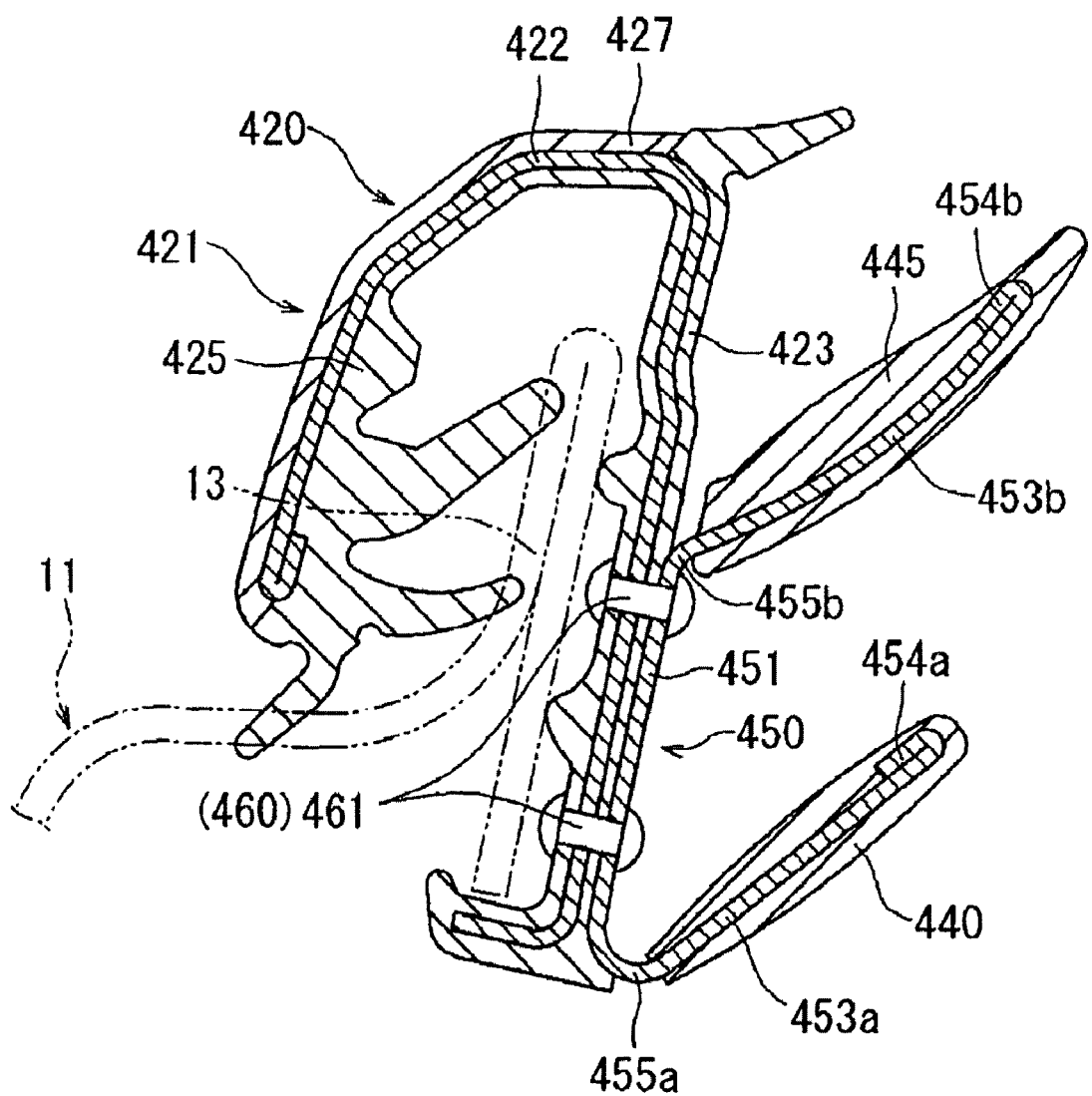
FIG. 11 is a cross-sectional view showing the state in which a belt molding for vehicles according to a fourth embodiment of the present invention is mounted to a flange portion of a door outer panel as a mounting member.

FIG. 11 is a cross-sectional view (corresponding to the cross-sectional view taken along the line III-III in FIG. 1) showing the state in which a belt molding for vehicles according to the fourth embodiment of the present invention is mounted to a flange portion as a mounting member. In this figure, the window pane is not illustrated since it is the same as that of the first embodiment. FIG. 12 is a development view showing an elastic member of the belt molding.

Figure 12:
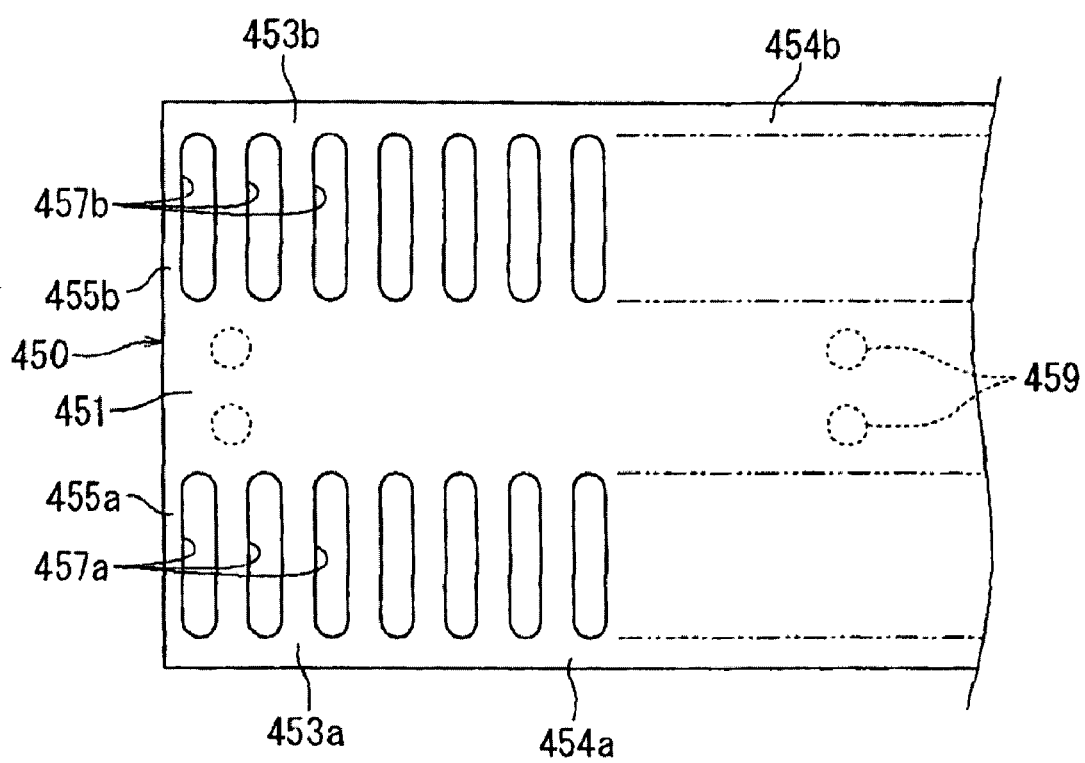
FIG. 12 is a development view showing an elastic repulsive member of the belt molding.

As shown in FIGS. 11 and 12, in this fourth embodiment, the attaching member 421 of the belt molding for vehicles 420 capable of being attached to the flange portion 13 as a mounting member is formed by extruding a soft elastic polymer material into a member having a generally inverted U-shape in cross-section, and includes, in the same manner as in the first embodiment, the inner and outer, i.e., first and second engage wall portions 423 and 425, and a connecting wall portion 427. Inserted in the first and second engage wall portions 423 and 425 and the connecting wall portion 427 is a rigid core member 422, such as, e.g., a steel plate.

The first and second long seal lips 440 and 445 formed on the first side wall portion 423 of the attaching member 421 at a certain distance in the movement direction (up-and-down direction) of the window pane is formed of a soft elastic polymer material separately from the attaching member 421 and attached to the first engage wall portion 423 of the attaching member 421 via an elastic repulsive member 450 mentioned below.

In detail, the elastic repulsive member 450 of this fourth embodiment has a fixed piece portion 451, a first connecting piece portion 455a at the widthwise side edge of the fixed piece portion 451 at the first seal lip 440 side, a second connecting piece portion 455b at the widthwise side edge of the fixed piece portion 451 at the second seal lip 445 side, a first shifting piece portion 453a bent at the first connecting piece portion 455a, and a second shifting piece portion 453b bent at the second connecting piece portion 455b. At least a part of the first shifting piece portion 453a at the first seal lip 440 side is embedded in the first seal lip 440 along the longitudinal direction of the first seal lip 440.

Furthermore, at least a part of the second shifting piece portion 453b at the second seal lip 445 side is embedded in the second seal lip 445 along the longitudinal direction of the second seal lip 445.

Also in this fourth embodiment, the elastic polymer materials of the first and second seal lips 440 and 445 are separated from the first engage wall portion 423, respectively. With this structure, the same advantages as in the third embodiment can be obtained.

The fixed piece portion 451 of the elastic repulsive member 450 is fixed to the first engage wall portion 423 of the attaching member 421 with fasteners 460, such as, e.g., upper and lower rivets 461, as fastening means in the same manner as in the third embodiment.

Furthermore, the fixed piece portion 451 of the elastic repulsive member 450 is formed into a flat shape, and the connecting piece portions 455a and 455b are preferably provided with the same slit-like plural removed portions 457a and 457b as in the first embodiment at certain intervals in the longitudinal direction (see FIG. 12).

The elastic repulsive member 450 is preferably formed of a metal plate as explained in the first embodiment.

Furthermore, as shown in FIG. 11 and explained in the third embodiment, it is preferable that the tip end folded back portions 454a and 454b of the shifting piece portions 453a and 453*b* are embedded up to the vicinities of the tip ends of the first and second seal lips 440 and 445, respectively.

The other structure of this fourth embodiment is the same as that of the first embodiment, and therefore the explanation will be omitted. As shown in FIGS. 11 and 12, in the belt molding for vehicles 420 according to this fourth embodiment, reference numerals in FIGS. 11 and 12 each showing the structural member/portion corresponding to that of the belt molding for vehicles 20 of the first embodiment are expressed as 4xx. In other words, in this embodiment, the corresponding reference numeral is denoted by adding "4" ahead of the reference numeral of each structural member/portion of the first embodiment.

Therefore, in this fourth embodiment, the second seal lip 445 located at the upper side can have the same restoring force as that of the first seal lip 440 located at the lower side by the elastic restoring force of the connecting piece portion 445*a* of the elastic repulsive member 450, which enables improved performance of wiping the surface of the window pane 9.

Especially, in this fourth embodiment, the second seal lip 445 also can be quickly restored as compared with a conventional one, which further improves the performance of wiping the surface of the window pane 9.

Fifth Embodiment

Next, a fifth embodiment of the present invention will be explained with reference to FIGS. 13 and 14.

Figure 13:
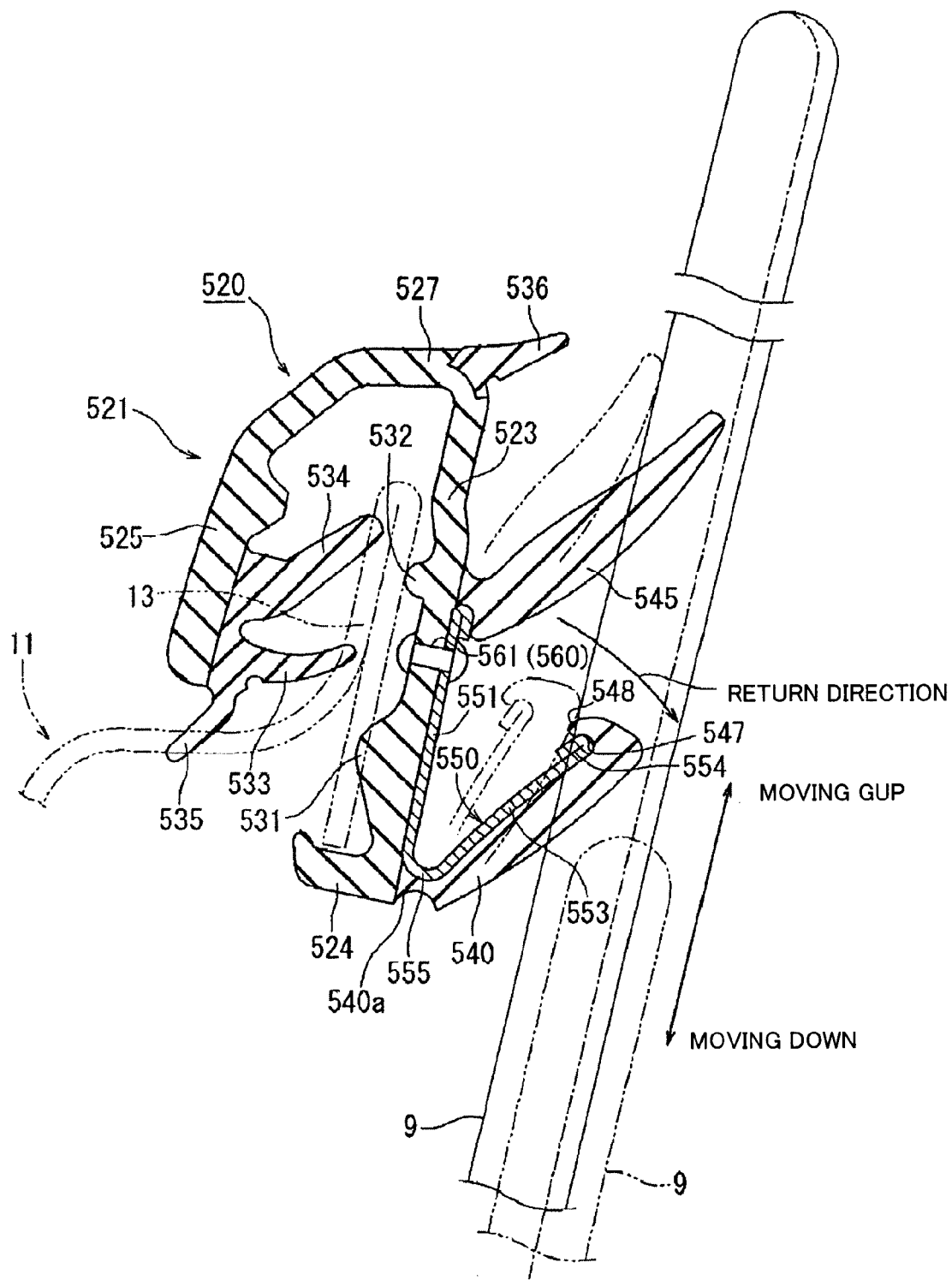
FIG. 13 is a cross-sectional view showing the state in which a belt molding for vehicles according to a fifth embodiment of the present invention is mounted to a flange portion of a door outer panel as a mounting member.

FIG. 13 is a cross-sectional view (corresponding to the cross-sectional view taken along the line III-III in FIG. 3) showing the state in which a belt molding for vehicles for vehicles according to the fifth embodiment of the present invention is mounted to a flange portion as a mounting member. FIG. 14 is a development view of an elastic member in a flat shape before being formed into a predetermined shape.

Figure 14:
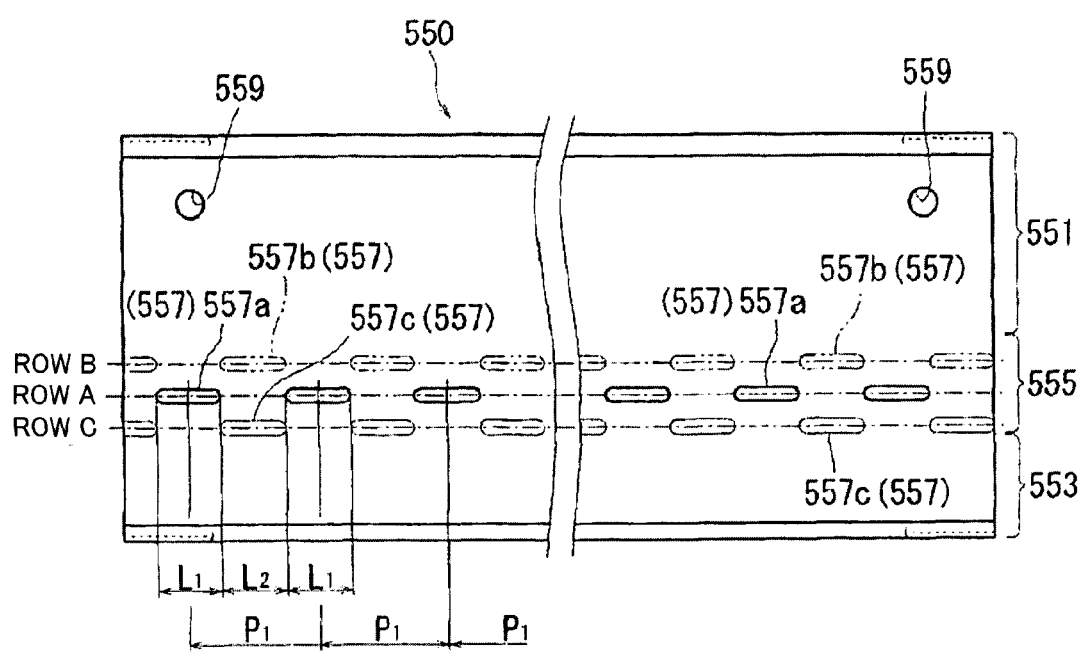
FIG. 14 is a development view of an elastic member in a flat shape before being formed into a predetermined shape.

As shown in FIGS. 13 and 14, also in this fifth embodiment, the connecting piece portion 555 of the elastic repulsive member 550 has a plurality of removed portions 557 (the removed portion can be, for example, a circular hole, an oval hole, or a slit, but not limited thereto) arranged at certain intervals in the longitudinal direction to form at least one row.

The plurality of removed portions 557*a* (shown by a sold line in FIG. 14) forming a row A as one of rows are each formed into an oval shape elongated in the longitudinal direction of the elastic repulsive member 550.

Further, the plurality of removed portions 557*a* forming the row A are formed at the regular intervals (pitches) P1 in the longitudinal direction.

The length L1 of each removed portion 557*a* is set so as not to exceed the interval P1. That is, the plurality of removed portions 557*a* are arranged at a constant distance L2 in the longitudinal direction. By increasing the ratio L2/L1, the reduction rate of the elastic force and that of the elastic restoring force will decrease. By decreasing the ratio L2/L1, the reduction rate of the elastic force and that of the elastic restoring force will increase. As shown in FIG. 14, in cases where the ratio L2/L1 is set to 1/1 (i.e., L2/L1=1/1), the elastic force and the elastic restoring force will decrease to 1/2 as compared with the case in which the elastic repulsive member is not provided with a plurality of removed portions 557*a*.

Furthermore, in case where predetermined reduction rate of the elastic force and that of the elastic restoring force cannot be obtained only by the plurality of removed portions 557*a* forming the row A, a plurality of removed portions 557*b* and/or 557*c* forming another row can be formed in the connecting piece portion 555 of the elastic repulsive member 550.

In detail, as shown in FIG. 14, in addition to the plurality of removed portions 557*a* (shown by the solid line in FIG. 14) forming the row A as one of rows, a plurality of removed portions 557*b* (shown by the two-dot chain line) forming another at least one row, e.g., the row B upwardly apart from the row A as shown in FIG. 14, at a position away from the row A in the widthwise direction of the elastic repulsive member can be formed in the connecting piece portion 555 of the elastic repulsive member 550 at certain intervals in the longitudinal direction.

Furthermore, a plurality of removed portions (shown by a thin line) forming the row C downwardly apart from the plurality of removed portions 557*a* forming the row A can be formed.

Furthermore, it is preferable that the row A including the plurality of removed portions 557*a*, and the row B and/or the row C including the other plurality of removed portions 557*b* and/or 557*c* are arranged in parallel with each other.

Furthermore, it is preferable that the plurality of removed portions 557*a* forming the row A and the plurality of removed portions 557*b* and/or 557*c* forming the other row B and/or row C are arranged so as to be displaced in the longitudinal direction in a staggered manner.

For example, in cases where a plurality of removed portions forming two rows, e.g., removed portions forming the row A and removed portions forming the row B, are formed in the connecting piece portion 555 of the elastic repulsive member 550, the elastic force and the elastic restoring force will decrease to 1/4 (i.e., 1/2×1/2) as compared with the case in which the connecting piece portion has no the removed portions 557*a* and 557*b*.

In cases where a plurality of removed portions forming three rows, i.e., removed portions forming the row A, removed portions forming the row B, and removed portions forming the row C, are formed in the connecting piece portion 555 of the elastic repulsive member 550, the elastic force and the elastic restoring force will decrease to 1/8 (i.e., 1/2×1/2×1/2) as compared with the case in which the connecting piece portion has no the removed portions 557*a*, 557*b* and 557*c*.

Furthermore, forming of the removed portions 557*a* (557*b*, 557*c*) in the connecting piece portion 555 of the elastic repulsive member 550 can be performed in a state in which the elastic repulsive member 550 is in a flat plate state before forming the elastic repulsive member into a V-shape or can be performed after bending the elastic repulsive member 550 into a V-shape. Forming of the removed portions 557*a* (557*b*, 557*c*) can be easily performed by, for example, piercing by press forming, or meltdown using $CO_2$ laser.

Furthermore, in this fifth embodiment, the groove depth of the engaging recess groove 547 of the first seal lip 540 with which the tip end folded back portion 554 of the shifting piece portion 553 of the elastic repulsive member 550 is engaged is formed to be shallower than that of the second embodiment. In other words, a cover portion 548 covering the tip end folded back portion 554 of the shifting piece portion 553 is formed to be smaller than that of the second embodiment so that a part of the folded back portion 554 is exposed.

In the belt molding for vehicles 520 according to this fifth embodiment, the structural members and the structure other than the elastic repulsive member 550 is the same as that of the second embodiment, therefore the explanation will be omitted to avoid the cumulative explanation.

In the belt molding for vehicles 520 according to this fifth embodiment, reference numerals corresponding to the same structural member and structure as in the belt molding for vehicles 220 of the second embodiment are denoted as 5xx as shown in FIGS. 13 and 14.

Therefore, in this fifth embodiment, in the same manner as in the second embodiment, the performance of wiping the surface of the window pane 9 can be improved.

Furthermore, in this fifth embodiment, at the connecting piece portion 555 of the elastic repulsive member 550, a plurality of removed portions 557*a* each having an oval shape elongated in the longitudinal direction are arranged in the longitudinal direction while keeping the same interval P1 to form the row A as a single row.

The length L1 of each of the plurality of removed portions 557*a* forming the row A is set so as not to exceed the interval P1, and the plurality of removed portions 557*a* are arranged with a constant distance L2 in the longitudinal direction. Therefore, by increasing the ratio L2/L1, the reduction rate of the elastic force and the elastic restoring force can be decreased. To the contrary, by decreasing the ratio L2/L1, the reduction rate of the elastic force and the elastic restoring force can be increased. As a result, the elastic force and elastic restoring force of the connecting piece portion 555 of the elastic repulsive member 550 can be easily set at a desired reduction rate.

Furthermore, by arranging the plurality of removed portions 557*a* forming the row A as one row, and the other plurality of removed portions 557*b* and/or 557*c* forming the row B and/or row C as the other at least one row are arranged at the connecting piece portion 555 of the elastic repulsive member 550, the range of the reduction rate of the elastic force and elastic restoring force of the connecting piece portion 555 of the elastic repulsive member 550 can be increased.

Furthermore, the plurality of removed portions 557*a* forming the row A and the other plurality of removed portions 557*b* and/or 557*c* forming the other at least one row B and/or row C are arranged in parallel with each other. Therefore, setting of the desired elastic force and elastic repulsive force of the connecting piece portion 555 can be performed more easily.

Furthermore, the plurality of removed portions 557*a* forming the row A and the other plurality of removed portions 557*b* and/or 557*c* forming the row B and/or row C are arranged so as to be displaced in the longitudinal direction in a staggered manner. Therefore, it becomes easy to set the desired elastic force and elastic restoring force evenly along the entire length of the connecting piece portion 55 in the longitudinal direction.

It should be noted that the present invention is not limited to the aforementioned first to fifth embodiments, and can be carded out, for example, in the following various manner, within the scope not exceeding the scope of the present invention.

In the aforementioned embodiments, the present invention was explained in detail while exemplifying an outer belt molding for a vehicle front door as an example. The present invention, however, is not limited to the outer belt molding for a front door, and can be applied to an outer belt molding for a rear door in the same manner.

In the aforementioned embodiments, the invention was explained while exemplifying an outer belt molding for a vehicle front door having two seal lips arranged in the up-and-down direction. The number of the seal lips, however, can be one. Furthermore, the present invention can also be applied to an inner belt molding to be mounted at the vehicle interior side inner than the up-and-down window pane. In this case, there are two cases, i.e., the first engage wall portion 23 (223, 323, 423, 523) of the attaching member 21 is engaged with the flange portion of the door inner panel in the same manner as in the door outer panel, and the first engage wall portion 23 (223, 323, 423, 523) of the attaching member 21 (221, 321, 421, 521) is engaged with the upper edge portion of another door inner trim fixed to the door inner belt molding. In the case of applying the present invention as an inner belt molding, the window pane contacting portion of the first seal lip 40 (240, 340, 440, 540) is brought into elastic contact with the vehicle interior side surface of the window pane 9 and wipes dirt and/or water droplets on the surface of the window pane 90 in accordance with the movements of the window pane 9. At this time, the window pane contacting portion of the first seal lip 40 (240, 340, 440, 540) mainly removes very tiny water droplets (so-called "mist") formed on the vehicle interior side surface of the window pane 9.

Furthermore, in the aforementioned embodiments, it was explained such that the longitudinal length of the elastic repulsive member 50 (150, 250, 350, 450, 550) is preferably set to have the same length as the entire longitudinal length of the first seal lip 40 (240, 340, 440, 540). In cases where the present invention is applied to an outer belt molding and/or the inner belt molding of a vehicle front door, it is not always required to set the longitudinal length of the elastic repulsive member to have the same length as the entire longitudinal length of the first seal lip 40 (240, 340, 440, 540). That is, as long as the area in the range which does not cause troubles for a driver in looking the rear view through the window pane 9 via a side mirror installed at the position near the front end of the front door can be wiped off, the purpose of the present invention can be attained. In practice, the aforementioned purpose can be attained by arranging the elastic repulsive member 50 (150, 250, 350, 450, 550) having a length covering from about ⅓ to about half of the length of the first seal lip 40 (240, 340, 440, 540) at the rear side with respect to the front end of the front door in the front-and-rear direction.

As explained above, the elastic repulsive member can be arranged only at the portion requiring the wiping performance. Furthermore, the elastic repulsive member can be disposed intermittently in the longitudinal direction of the belt molding.

In the aforementioned embodiments, the explanation was made by exemplifying the first seal lip 40 (240, 340, 440, 540) in which the seal lip is protruded obliquely upward. The seal lip is not limited to such a configuration. From the viewpoints of the drainage performance of the dirt and water stored between the seal lip and the surface of the window pane, in some belt moldings, a seal lip is formed obliquely downward. The present invention can also be applied to the belt molding constructed as mentioned above. In this case, by arranging the shifting piece portion of the elastic repulsive member at the low side of the seal lip protruded obliquely downward, the same effects as in the seal lip extended obliquely upward can be obtained.

Furthermore, in the aforementioned embodiments, the explanation was made by exemplifying the structure in which the mounting member is held by and between the protruding portions 31 to 34 protruded in the groove from the first engage wall portion 23 (223, 323, 423, 523) and the second engage wall portion 25 (225, 325, 425, 525) of the attaching member 21 (221, 321, 421, 521) as a means for mounting the attachment 21 (221, 321, 421, 521) of the belt molding 20 (220, 320, 420, 520) on the mounting member (e.g., the flange portion 13). In the present invention, another attaching means which can be replaced by the protruding portions 31 to 34 can be employed. That is, by attaching, in place of the protruding portions 31 to 34, a plurality of attaching clips having a function of holding the mounting member or capable of being inserted into holes or the like formed in the mounting member to be fixed therein at intervals in the longitudinal direction of the attaching member 21 (221, 321, 421, 521), the belt molding 20 (220, 320, 420, 520) can be attached to the mounting member with the attaching clips.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A belt molding for vehicles, comprising:
a long belt molding attaching member capable of being mounted to a mounting member disposed apart from a window pane with a predetermined space, the window pane being configured to be opened and closed in a plane direction, the window pane having a surface at an exterior or interior side, wherein the belt molding attaching member includes an engage wall portion, wherein the engage wall portion is positioned between the window pane and the mounting member, disposed in approximately parallel to the window pane and engaged with the mounting member when the belt molding attaching member is mounted to the mounting member;
a long seal lip integrally formed with the engage wall portion of the belt molding attaching member so as to be protruded in a direction crossing the surface of the window pane at a predetermined angle, the seal lip being capable of being brought into elastic contact with the surface of the window pane and made of a soft elastic polymer material; and
a long elastic repulsive member disposed between the engage wall portion and the seal lip, the elastic repulsive member including a plate shaped material, the plate shaped material being higher in creep deformation resistance than the elastic polymer material and faster in elastic restoring speed than a creep restoring speed of the elastic polymer material,
wherein the elastic repulsive member includes a fixed piece portion, a shifting piece portion and a connecting piece portion, the fixed piece portion, the shifting piece portion and the connecting piece portion being provided continuously,
wherein the fixed piece portion is fixed to the engage wall portion,
wherein the shifting piece portion is engaged with or integrally formed with the seal lip and configured to urge the seal lip toward the window pane,
wherein the connecting piece portion is positioned between the fixed piece portion and the shifting piece portion to connect the fixed piece portion and the shifting piece portion with a predetermined angle therebetween,
wherein the fixed piece portion of the elastic repulsive member is fixed to the engage wall portion in a state in which the fixed piece portion is prevented from being moved in a longitudinal direction and in a movement direction of the window pane,
wherein the shifting piece portion of the elastic repulsive member is engaged with or integrally formed with the seal lip so that the shifting piece portion always urges the seal lip toward the surface of the window pane by an elastic restoring force of the connecting piece portion itself or by a cooperative function of an elastic restoring force of the connecting piece portion itself and an elastic restoring force of the elastic polymer material,
wherein, when the belt molding attaching member is mounted to the mounting member and a distance between the engage wall portion and the surface of the window pane is increased during an opening or closing movement of the window pane, the seal lip is configured such that a contacting portion of the seal lip in contact with the surface of the window pane is elastically restored by the elastic restoring force of the connecting piece portion toward a thickness direction of the window pane at a speed exceeding a restoring speed obtained only by the elastic polymer material,
wherein the fixed piece portion of the elastic repulsive member is formed into a flat plate shape, and
wherein a plurality of removed portions are arranged at at least the connecting piece portion of the elastic repulsive member at certain intervals in the longitudinal direction to form at least one row.

2. The belt molding for vehicles as recited in claim 1, wherein the engage wall portion and the seal lip have engaging portions at opposed surfaces thereof, and wherein the fixed piece portion of the elastic repulsive member formed separately from the engage wall portion and the seal lip is engaged with the engaging portion of the engage wall portion and the shifting piece portion of the elastic repulsive member is engaged with the engaging portion of the seal lip.

3. The belt molding for vehicles as recited in claim 1, wherein, in a free state in which the seal lip is not in contact with the surface of the window pane in a window pane opened state, a tip end of the shifting piece portion of the elastic repulsive member is extended to a length sufficient to shift the contacting portion of the seal lip to a position where the contacting portion crosses an extended plane of the surface of the window pane and overlaps therewith.

4. The belt molding for vehicles as recited in claim 1, wherein the plurality of removed portions are formed into a slit shape continuously extended from the connecting piece portion over an entire width of the shifting piece portion, and wherein portions of the shifting piece portion disposed between the plurality of removed portions form a fork shape arranged noncontinuously in the longitudinal direction.

5. The belt molding for vehicles as recited in claim 1, wherein the plurality of the removed portions are formed into a slit shape extending in a widthwise direction so as to continue from the connecting piece portion of the elastic repulsive member to a vicinity of a widthwise tip end portion of the shifting piece portion, and wherein the widthwise tip end portion of the shifting piece portion is integrally continued in the longitudinal direction.

6. The belt molding for vehicles as recited in claim 1, wherein, at the connecting piece portion or the shifting piece portion of the elastic repulsive member, in addition to the plurality of removed portions forming one row, another plurality of removed portions forming another at least one row are arranged in a longitudinal direction at certain intervals at a position away from the one row in the widthwise direction.

7. The belt molding for vehicles as recited in claim 6, wherein the one row including the plurality of removed portions and another row including another plurality of removed portions are disposed in parallel with each other.

8. The belt molding for vehicles as recited in claim 6, wherein the plurality of removed portions forming the one row and the another plurality of removed portions forming another row are displaced mutually in the longitudinal direction in a staggered manner.

9. The belt molding for vehicles as recited in claim 6, wherein at least one of the plurality of removed portions is formed into an oval shape elongated in the longitudinal direction.

10. The belt molding for vehicles as recited in claim 1, wherein the plurality of removed portions are formed at equal intervals in the longitudinal direction.

11. The belt molding for vehicles as recited in claim 1, wherein a total longitudinal length of the plurality of removed portions forming one row in the longitudinal direction is set to 10% or more but not exceeding 90% of an entire length of the connecting piece portion.

12. The belt molding for vehicles as recited in claim 1, wherein, at least a widthwise tip edge of the shifting piece portion, a reinforcing portion thicker than a thickness of the other portion of the shifting piece portion is formed continuously in the longitudinal direction.

13. The belt molding for vehicles as recited in claim 1, wherein a tip end side of the shifting piece portion of the elastic repulsive member is embedded in the seal lip along a longitudinal direction of the seal lip and integrally formed with the seal lip.

14. The belt molding for vehicles as recited in claim 1, wherein the fixed piece portion of the elastic repulsive member is fixed to the engage wall portion with a fastening means.

15. The belt molding for vehicles as recited in claim 1, wherein the elastic repulsive member is a molded article of an elastic synthetic resin being higher in hardness, rigidity and spring nature than the elastic polymer material of the seal lip.

16. The belt molding for vehicles as recited in claim 1, wherein the elastic repulsive member is a formed article of metal being higher in hardness, rigidity and spring nature than the elastic polymer material of the seal lip.

17. The belt molding for vehicles as recited in claim 16, wherein the metal plate is one of metal spring plates selected from the group consisting of a stainless steel spring plate, a rust prevention treated carbon steel spring plate, a titan alloy spring plate, a copper alloy spring plate and an aluminum alloy spring plate.

18. The belt molding for vehicles as recited in claim 16, wherein the metal plate falls within the range of 0.01 mm to 0.50 mm in thickness.

19. The belt molding for vehicles as recited in claim 18, wherein the metal plate falls within the range of 0.05 mm to 0.25 mm in thickness.

20. The belt molding for vehicles as recited in claim 1, wherein two seal lips are formed on the engage wall portion at a certain interval along a moving direction of the window pane, and wherein the shifting piece portion is engaged with or integrally formed with at least a lower side seal lip.

21. The belt molding for vehicles as recited in claim 1, wherein the surface is located at an exterior side of the window pane.

\* \* \* \* \*